US012736894B2

(12) United States Patent
Suzuki et al.

(10) Patent No.: US 12,736,894 B2
(45) Date of Patent: Sep. 15, 2026

(54) IMAGE FORMING APPARATUS

(71) Applicant: CANON KABUSHIKI KAISHA, Tokyo (JP)

(72) Inventors: Tomohiro Suzuki, Chiba (JP); Kohei Koguchi, Tokyo (JP); Noritomo Yamaguchi, Kanagawa (JP); Ken Oi, Tokyo (JP); Daigo Yamauchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/192,911

(22) Filed: Apr. 29, 2025

(65) Prior Publication Data

US 2025/0348022 A1 Nov. 13, 2025

(30) Foreign Application Priority Data

May 7, 2024 (JP) ................................ 2024-075079

(51) Int. Cl.
*G03G 15/08* (2006.01)
*G03G 21/14* (2006.01)

(52) U.S. Cl.
CPC ....... *G03G 15/086* (2013.01); *G03G 15/0875* (2013.01); *G03G 21/14* (2013.01); *G03G 2215/068* (2013.01); *G03G 2215/0888* (2013.01)

(58) Field of Classification Search
CPC ....... G03G 2215/0177; G03G 15/0173; G03G 15/0853; G03G 15/086
See application file for complete search history.

(56) References Cited

U.S. PATENT DOCUMENTS

2006/0198661 A1* 9/2006 Nishihama ......... G03G 15/0121 399/257
2006/0290951 A1 12/2006 Yamasaki
2011/0052223 A1* 3/2011 Iwanami ............ G03G 15/0853 399/30

(Continued)

FOREIGN PATENT DOCUMENTS

JP 2004264471 A 9/2004
JP 2004272017 A 9/2004

(Continued)

*Primary Examiner* — Sevan A Aydin
(74) *Attorney, Agent, or Firm* — Canon U.S.A., Inc. IP Division

(57) ABSTRACT

The present invention is directed to reducing moving members for moving a magnetic body relative to a developer. An image forming apparatus includes a developing unit including an accommodation portion, a developing member, and a magnetic body unit, the magnetic body unit being located inside the accommodation portion and supported to be movable relative to the accommodation portion in a moving direction, a rotary, and a magnetic sensor. A rotation period for the rotary to make one rotation includes a first period. In the first period, the moving direction includes a vertically downward direction. The first period includes a contact period during which the magnetic body unit is received by a developer. The contact period includes timing at which a rotation center of the rotary, the magnetic body unit, and the magnetic sensor are aligned on a straight line in a radial direction of rotation of the rotary.

19 Claims, 21 Drawing Sheets

(56) References Cited

U.S. PATENT DOCUMENTS

| | | | | |
|---|---|---|---|---|
| 2018/0246439 | A1 | 8/2018 | Carpenter | |
| 2020/0026221 | A1* | 1/2020 | Leemhuis ............ | G03G 15/086 |
| 2025/0271788 | A1* | 8/2025 | Obukuro ............ | G03G 15/0853 |

FOREIGN PATENT DOCUMENTS

| | | | | |
|---|---|---|---|---|
| JP | 2005031378 | A | * | 3/2006 |
| JP | 2011175056 | A | | 9/2011 |
| JP | 2012042712 | A | | 3/2012 |
| JP | 2020118788 | A | | 8/2020 |

* cited by examiner

IMAGE FORMING APPARATUS

BACKGROUND OF THE INVENTION

Field of the Invention

The present invention relates to an image forming apparatus that forms an image on a recording material.

Description of the Related Art

An image forming apparatus discussed in Japanese Patent Application Laid-Open Publication No. 2011-175056 includes a movable magnetic body inside an accommodation portion accommodating a developer, and detects the amount of the developer in the accommodation portion by detecting a magnetic field produced by the magnetic body.

To accurately detect the remaining level of the developer, the image forming apparatus discussed in Japanese Patent Application Laid-Open Publication No. 2011-175056 also includes a moving member that moves the magnetic body relative to the developer.

Since the image forming apparatus discussed in Japanese Patent Application Laid-Open Publication No. 2011-175056 includes the moving member inside the accommodation portion, the amount of the developer that can be accommodated in the accommodation portion is decreased by the presence of the moving member.

SUMMARY OF THE INVENTION

The present invention is directed to reducing the moving member for moving the magnetic body relative to the developer.

An aspect of the present invention is as follows.

An image forming apparatus includes a developing unit including an accommodation portion configured to accommodate a developer, a developing member configured to develop an electrostatic latent image formed on a photosensitive drum with the developer accommodated in the accommodation portion, and a magnetic body unit including a magnetic body, the magnetic body unit being located inside the accommodation portion and supported to be movable relative to the accommodation portion in a moving direction, a rotary configured to rotate, the rotary including the developing unit, and a magnetic sensor, wherein a rotation period for the rotary to make one rotation includes a first period, wherein in the first period, the moving direction includes a vertically downward component, wherein the first period includes a contact period during which the magnetic body unit contacts the developer and is received by the developer, wherein the contact period includes parallel timing at which a rotation center of the rotary, the magnetic body unit, and the magnetic sensor are aligned on a straight line in a radial direction of rotation of the rotary as viewed in a rotation axis direction of the rotary, and wherein the magnetic sensor is configured to output a signal based on a magnetic field produced by the magnetic body in at least a part of the first period.

Further features of the present invention will become apparent from the following description of exemplary embodiments with reference to the attached drawings.

DESCRIPTION OF THE EMBODIMENT

Figure 1:
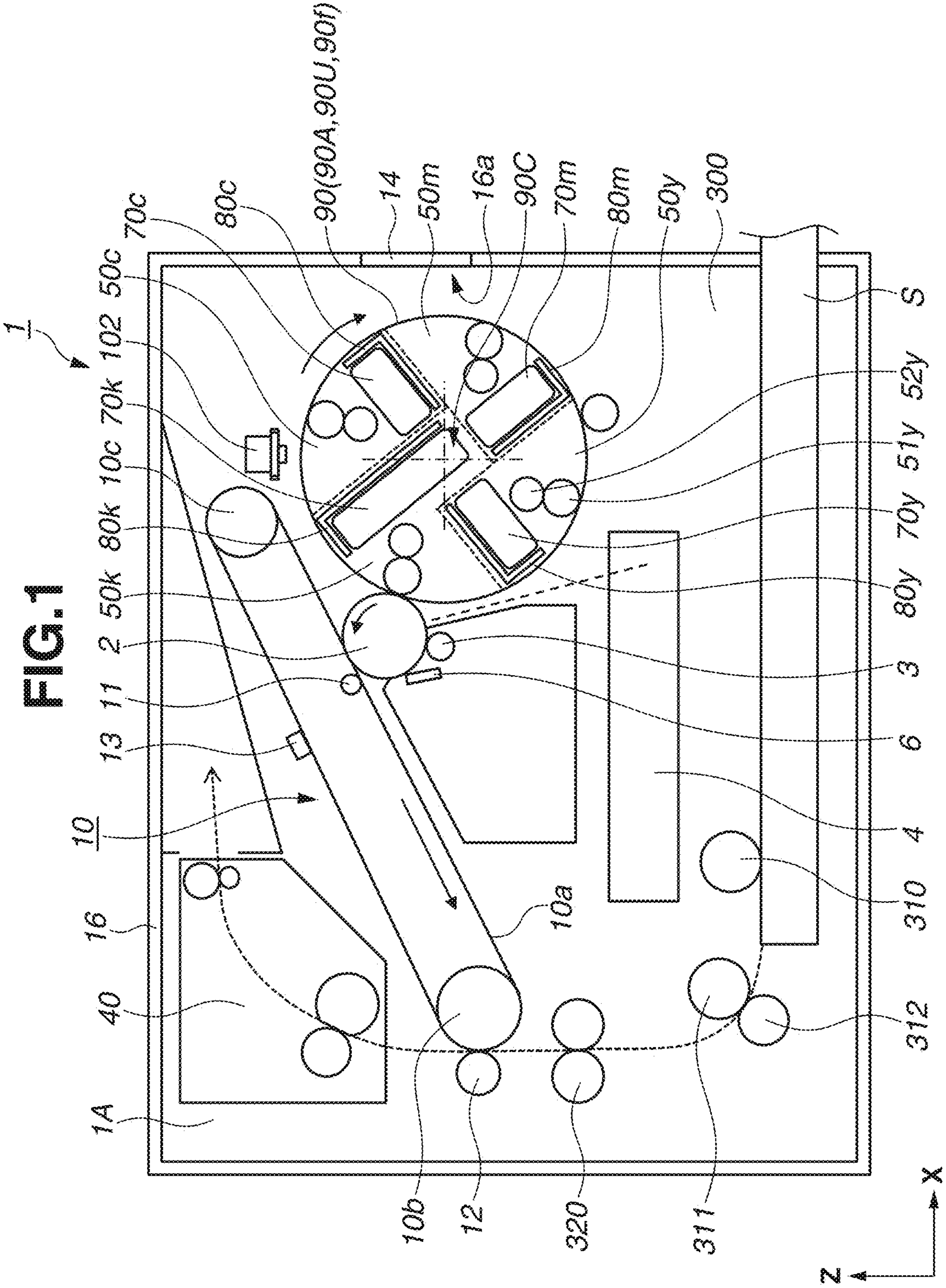
FIG. 1 is a schematic diagram illustrating an image forming apparatus according to a first embodiment.

An embodiment of the present invention will be described below with reference to the drawings.

An image forming apparatus 1 according to a first embodiment will be described with reference to FIGS. 1 to 12B.

In the following description and the drawings, a vertical direction when the image forming apparatus 1 is installed on a horizontal plane will be referred to as a Z direction. A direction that intersects the Z direction and is along a rotation axis 90C of a rotary main body 90 to be described below (rotation axis direction of a rotary) will be referred to as a Y direction. A direction intersecting both the Z and Y directions will be referred to as an X direction. The X and Y directions are desirably horizontal directions. The X, Y, and Z directions are desirably orthogonal to each other. Where appropriate, the directions of the arrows X, Y, and Z illustrated in the drawings will be referred to as a +X side, a +Y side, and a +Z side, respectively, and the respective opposite sides as a −X side, a −Y side, and a −Z side.

(Overall Configuration of Image Forming Apparatus)

An overall configuration of the image forming apparatus 1 will initially be described. The image forming apparatus 1 is a laser beam printer that electrophotographically forms an image on a sheet S. More specifically, the image forming apparatus 1 is a color laser beam printer including four developing units 50*y*, 50*m*, 50*c*, and 50*k*. Various sheet materials of different sizes and substances can be used as the sheet S serving as a recording material (recording medium). Examples include sheets of paper such as plain paper and thick paper, plastic films, cloth, surface-treated sheet materials such as coated paper, and sheet materials of special shapes such as envelops and index paper.

Figure 2:
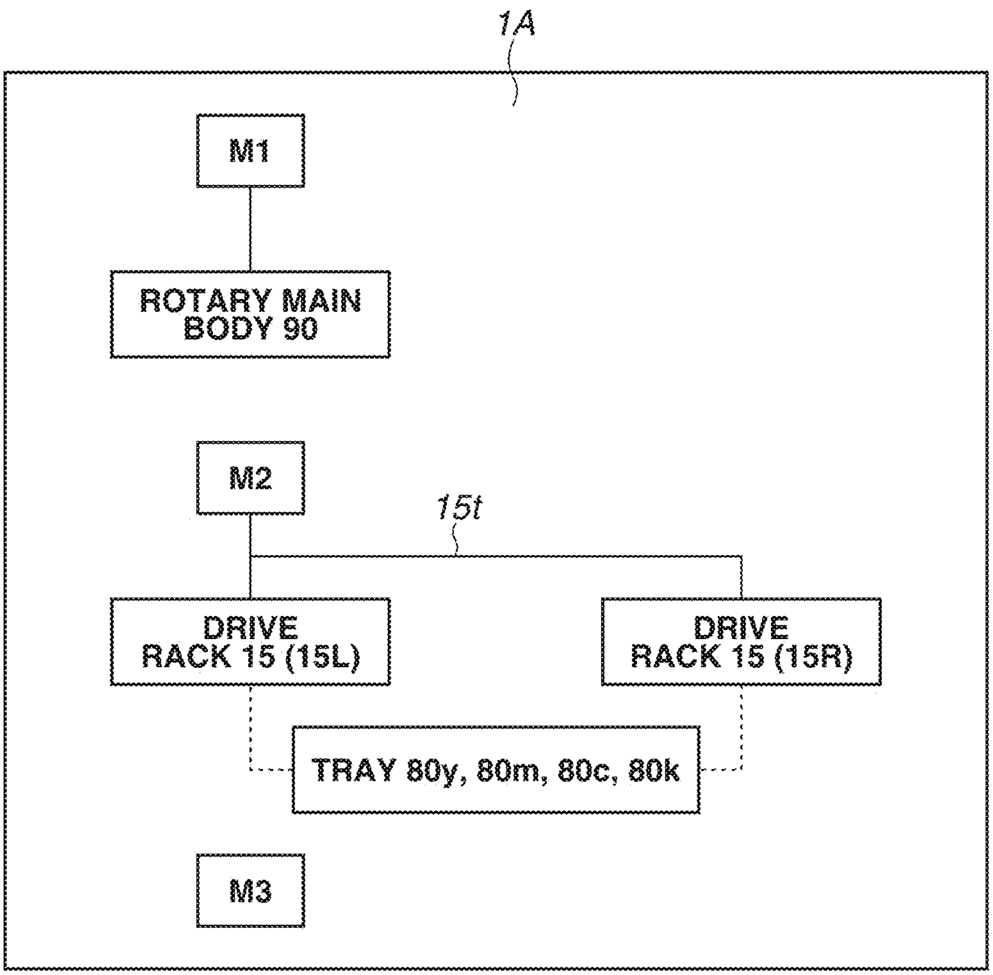
FIG. 2 is a configuration diagram illustrating the image forming apparatus according to the first embodiment.
Figure 3:
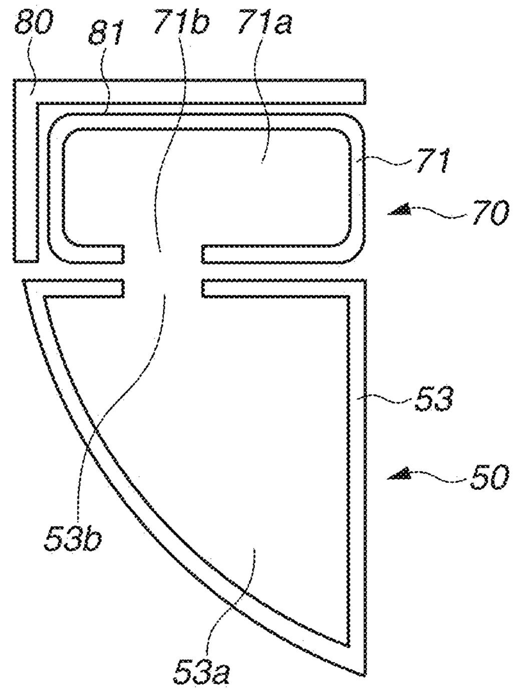
FIG. 3 is a schematic diagram illustrating a developing unit, a toner cartridge, and a tray according to the first embodiment.

A schematic configuration and image forming operation of the image forming apparatus 1 will be described with reference to FIGS. 1, 2, and 3. FIG. 1 is a schematic diagram illustrating a sectional configuration of the image forming apparatus 1. FIG. 2 is a diagram for describing driving sources of the image forming apparatus 1. FIG. 3 is a conceptual diagram illustrating a configuration for supplying toner from a toner cartridge 70 to a developing unit 50.

As illustrated in FIG. 1, the image forming apparatus 1 includes an image forming apparatus main body (hereinafter, apparatus main body) 1A and toner cartridges 70*y*, 70*m*, 70*c*, and 70*k* detachably attachable to the apparatus main body 1A. The apparatus main body 1A according to the present embodiment refers to the image forming apparatus 1 excluding the toner cartridges 70*y*, 70*m*, 70*c*, and 70*k*.

The apparatus main body 1A of the image forming apparatus 1 includes an electrophotographic photosensitive body (hereinafter, photosensitive drum) 2 of drum shape (cylindrical shape) as an image bearing member that bears an electrostatic latent image. A charging roller 3, a scanner 4 serving as an exposure device, and a cleaning unit 6 are arranged near the photosensitive drum 2.

The charging roller 3 is an example of a charging unit for uniformly charging the photosensitive drum 2. The scanner 4 is an example of an exposure unit that irradiates the photosensitive drum 2 with laser light based on image information for exposure. Irradiating the charged photosensitive drum 2 with the laser light forms an electrostatic latent image on the surface of the photosensitive drum 2. The cleaning unit 6 is an example of a cleaning part that removes toner remaining on the surface of the photosensitive drum 2.

The apparatus main body 1A further includes a sheet storage unit 300, a pickup roller 310, a feed roller 311, a separation roller 312, a conveyance roller pair 320, a secondary transfer roller 12, a fixing device 40, and an intermediate transfer unit 10. The pickup roller 310 is an example of a feed unit that feeds sheets S. The feed roller 311 and the separation roller 312 are an example of a separation conveyance unit that separates the sheets S one by one using frictional force, and conveys the separated sheet S. The secondary transfer roller 12 is an example of a transfer unit that transfers an image from an intermediate transfer belt 10*a* to the sheet S.

The intermediate transfer unit 10 includes the intermediate transfer belt 10*a*, a belt driving roller 10*b*, a tension roller 10*c*, a cleaning device 13, and a primary transfer roller 11. The intermediate transfer belt 10*a* is an example of an intermediate transfer member that bears an image transferred (primarily transferred) from the photosensitive drum 2 and conveys the image for the sake of transfer (secondary transfer) to the sheet S. The intermediate transfer belt 10*a* is stretched across the belt driving roller 10*b* and the tension roller 10*c*. The belt driving roller 10*b* is a driving member that is driven to rotate by a driving source and thereby conveys the intermediate transfer belt 10*a*.

The apparatus main body 1A also includes a rotary main body (rotary, rotating body, or developing device) 90 including the developing units 50*y*, 50*m*, 50*c*, and 50*k*. As will be described below, in the present embodiment, trays (support members) 80*y*, 80*m*, 80*c*, and 80*k* are attached to the rotary main body 90. The toner cartridges 70*y*, 70*m*, 70*c*, and 70*k* are detachably attached to the trays 80*y*, 80*m*, 80*c*, and 80*k*.

In the following description, a plurality of members with similar functions can be referred to by attaching ordinal numbers. For example, one of the toner cartridges 70*y*, 70*m*, 70*c*, and 70*k* can be referred to as a first toner cartridge, one of the remaining three as a second toner cartridge, one of the remaining two as a third toner cartridge, and the last one as a fourth toner cartridge. Similarly, one of the trays 80*y*, 80*m*, 80*c*, and 80*k* can be referred to as a first tray, one of the remaining three as a second tray, one of the remaining two as a third tray, and the last one as a fourth tray. In other words, one of the trays 80*y* to 80*k* is an example of a first support member, another of the trays 80*y* to 80*k* is an example of a second support member, another of the trays 80*y* to 80*k* is an example of a third support member, and the last one of the trays 80*y* to 80*k* is an example of a fourth support member. Such numbering is used for the convenience of description only, and in principal can be interchanged as appropriate.

The developing units (first to fourth developing units) 50*y*, 50*m*, 50*c*, and 50*k* are an example of developing parts that develop (visualize) electrostatic latent images formed on the photosensitive drum 2 into toner images using toners of respective corresponding colors. The developing units 50*y*, 50*m*, 50*c*, and 50*k* are developing members that develop photoelectric latent images formed on the photosensitive drum 2 using yellow toner, magenta toner, cyan toner, and black toner, respectively. More specifically, the developing members develop electrostatic latent images formed on the photosensitive drum 2 with developers accommodated in developing frames 53. The developing units 50*y*, 50*m*, 50*c*, and 50*k* may be arranged in a different order than illustrated in FIG. 1.

The developing unit 50*y* includes a developing roller 51*y*, a supply roller 52*y*, and a developing blade. The developing roller 51*y* is a developer bearing member that bears toner as a developer and rotates to supply the toner to the photosensitive drum 2. The supply roller 52*y* is a supply member that is located in contact with the developing roller 51*y* and supplies the toner to the developing roller 51*y*. The developing blade is a regulation member that regulates the thickness of the toner layer borne on the developing roller 51*y*. The other developing units 50*m*, 50*c*, and 50*k* include similar developing rollers 51*m*, 51*c*, and 51*k*, supply rollers 52*m*, 52*c*, and 52*k*, and developing blades.

The toner cartridges 70*y*, 70*m*, 70*c*, and 70*k* corresponding to the developing units 50*y*, 50*m*, 50*c*, and 50*k* are attached to the rotary main body 90. The toner cartridges 70*y*, 70*m*, 70*c*, and 70*k* accommodate yellow toner, magenta toner, cyan toner, and black toner inside as the toners to be supplied to the developing units 50*y*, 50*m*, 50*c*, and 50*k*, respectively. One of the four color toners can be referred to as a first toner, one of the remaining three color toners as a second toner, one of the remaining two color toners as a third toner, and the last one as a fourth toner. For example, the black toner can be said to be an example of the first toner, and the magenta toner an example of the second toner. Such numbering is used for the convenience of description only, and in principle can be interchanged as appropriate.

The rotary main body 90 includes a rotary frame 90*f* that supports the developing units 50*y*, 50*m*, 50*c*, and 50*k*. The developing units 50*y*, 50*m*, 50*c*, and 50*k* are supported by the rotary frame 90*f* that is a rotatable support member.

The trays 80*y*, 80*m*, 80*c*, and 80*k* are attached to the rotary main body 90. The combination of the rotary main body 90 and the trays 80*y*, 80*m*, 80*c*, and 80*k* can be referred to as a rotary unit 90U. In other words, the rotary unit 90U includes the rotary main body 90 and the trays 80*y*, 80*m*, 80*c*, and 80*k*.

The toner cartridges 70*y* to 70*k* are held by the trays 80*y* to 80*k* in a detachably attachable manner. As will be described below, the trays 80*y* to 80*k* are supported to be slidable to outside the rotary main body 90. The combination of the rotary unit 90U and the toner cartridges 70*y*, 70*m*, 70*c*, and 70*k* can be referred to as a rotary assembly 90A. In other words, the rotary assembly 90A includes the rotary unit 90U and the toner cartridges 70*y*, 70*m*, 70*c*, and 70*k*.

As will be described below, the rotary main body 90 can rotate about the rotation axis (rotation center) 90C. The rotation axis 90C matches the rotation axes of the rotary frame 90*f* and the rotary assembly 90A. The rotation axis 90C is substantially parallel to the rotation axis (rotation center) of the photosensitive drum 2.

By rotating about the rotation axis 90C, the rotary main body 90 can assume developing orientations where one of the developing rollers 51*y*, 51*m*, 51*c*, and 51*k* is opposed to the photosensitive drum 2. The orientation in which the developing roller 51*y* is opposed to the photosensitive drum 2 will be referred to as a yellow developing orientation. The orientation in which the developing roller 51*m* is opposed to the photosensitive drum 2 will be referred to as a magenta developing orientation. The orientation in which the developing roller 51*c* is opposed to the photosensitive drum 2 will be referred to as a cyan developing orientation. The orientation in which the developing roller 51*k* is opposed to the photosensitive drum 2 will be referred to as a black developing orientation. In other words, the rotary main body 90 can rotate about the rotation axis 90C so that the positions of the developing rollers 51*y*, 51*m*, 51*c*, and 51*k* with respect to the photosensitive drum 2 change. The black developing orientation is an example of a first developing orientation where a first developing roller (developing roller 51*k*) is opposed to the photosensitive drum 2. The other developing orientations are examples of a second developing orientation where a second developing roller (developing rollers 51*y* to 51*c*) is opposed to the photosensitive drum 2. The yellow, magenta, cyan, and black developing orientations may be referred to as first, second, third, and fourth developing orientations. Such numbering is used for the convenience of description only, and in principle can be interchanged as appropriate.

As illustrated in FIG. 2, the apparatus main body 1A includes motors M1, M2, and M3 serving as driving sources. As will be described below, the motor M1 supplies driving force for rotating the rotary main body 90 about the rotation axis 90C. In other words, the motor M1 rotates the rotary assembly 90A and the rotary unit 90U about the rotation axis 90C.

The apparatus main body 1A also includes a not-illustrated driving device including the motor M2 and a transmission device. The transmission device includes drive racks 15L and 15R serving as drive gears to be described below, and a transmission unit 15*t*. The driving force of the motor M2 is transmitted to the drive racks 15L and 15R by the transmission unit 15*t*. In other words, the motor M2 is configured to drive the drive racks 15L and 15R, and moves the trays 80*y*, 80*m*, 80*c*, and 80*k* relative to the rotary main body 90 via the drive racks 15L and 15R.

The motor M3 drives members other than those driven by the motors M1 and M2. For example, the motor M3 drives the photosensitive drum 2, the developing units 50*y*, 50*m*, 50*c*, and 50*k*, the pickup roller 310, the feed roller 311, the conveyance roller pair 320, the secondary transfer roller 12, the belt driving roller 10*b*, and the fixing device 40.

The members for the motors M1, M2, and M3 to drive can be changed as appropriate. The roles of any two or all three of the motors M1, M2, and M3 can be integrated into one motor. Driving sources other than the motors M1, M2, and M3 may be added.

The suffixes y, m, c, and k attached to the developing units 50*y*, 50*m*, 50*c*, and 50*k*, the toner cartridges 70*y*, 70*m*, 70*c*, and 70*k*, and the trays 80*y*, 80*m*, 80*c*, and 80*k* indicate the toner colors. The developing units 50*y*, 50*m*, 50*c*, and 50*k* have a common basic configuration and functions. The toner cartridges 70*y*, 70*m*, 70*c*, and 70*k* have a common basic configuration and functions. The trays 80*y*, 80*m*, 80*c*, and 80*k* have a common basic configuration and functions. When distinction is not needed, one of the four units, cartridges, or trays will therefore be described with the suffixes y, m, c, and k omitted.

As illustrated in FIG. 3, the toner cartridge 70 includes a toner frame 71. The toner frame 71 includes a toner accommodation portion 71*a* that accommodates toner, and a discharge opening 71*b* that communicates with the toner accommodation portion 71*a*.

The developing unit 50 includes a developing frame (accommodation frame) 53. The developing units 50*y*, 50*m*, 50*c*, and 50*k* include developing frames 53*y*, 53*m*, 53*c*, and 53*k*, respectively. The developing frames 53*y*, 53*m*, 53*c*, and 53*k* have a common configuration and functions. When distinction is not needed, one of the four developing frames 53 will therefore be described with the suffixes y, m, c, and k omitted.

Figure 13:
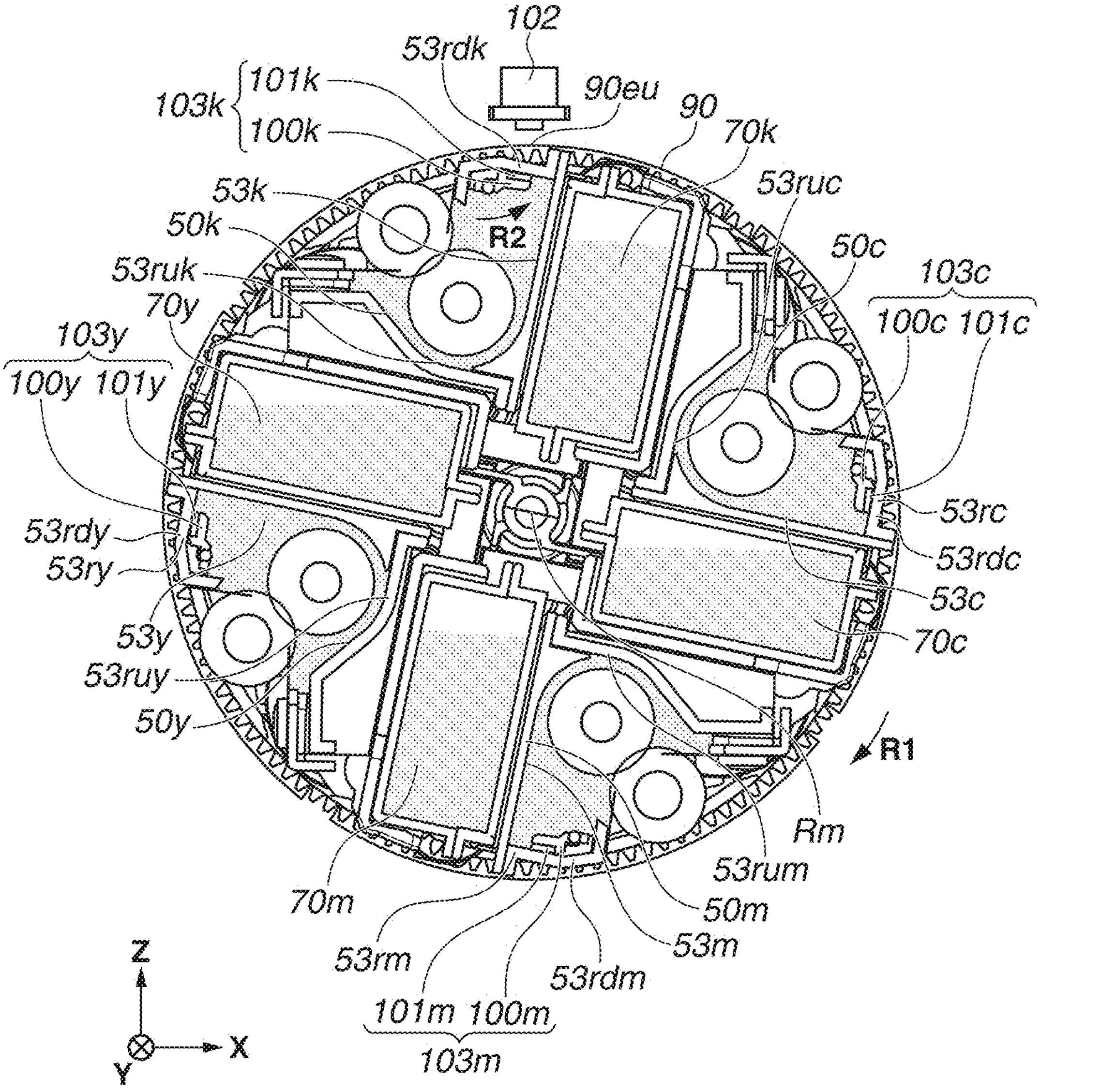
FIG. 13 is a plan view of the rotary main body according to the first embodiment.

The developing frame 53 includes a developing accommodation portion 53*a*, and a reception opening 53*b* that communicates with the developing accommodation portion (toner supply chamber) 53*a*. As illustrated in FIG. 13 to be described below, developing accommodation portions 53*ay*, 53*am*, 53*ac*, and 53*ak* accommodate yellow toner, magenta toner, cyan toner, and black toner, respectively. As described above, the developing unit 50 includes the developing roller 51 and the supply roller 52, which are omitted in FIG. 3.

The developing roller 51*k* included in the developing unit 50*k* is an example of the first developing roller. The developing roller 51*m* included in the developing unit 50*m* is an example of the second developing roller. The developing frame 53*k* (FIG. 4A) of the developing unit 50*k* including the developing accommodation portion 53*a* is an example of a first accommodation frame including a first accommodation portion. The developing frame 53*m* (FIG. 4A) of the developing unit 50*m* including the developing accommodation portion 53*a* is an example of a second developing frame including a second accommodation portion. The rotary main body 90 is an example of a rotatable rotary including the first developing roller, the second developing roller, the first accommodation frame including the first accommodation portion, and the second accommodation frame including the second accommodation portion. In the present embodiment, the rotary main body 90 includes first to fourth developing rollers and first to fourth accommodation frames.

As will be described below, the toner cartridge 70 can be moved to an attached position and a retracted position retracted from the attached position, relative to the developing frame 53. With the toner cartridge 70 at the attached position relative to the developing frame 53, the discharge opening 71*b* is opposed to the reception opening 53*b*. In other words, the toner accommodation portion 71*a* of the toner cartridge 70 and the developing accommodation portion 53*a* of the developing unit 50 communicate via the discharge opening 71*b* and the reception opening 53*b*. In supplying the toner from the toner cartridge 70 to the developing unit 50, at least a part of the reception opening 53*b* is located below at least a part of the discharge opening 71*b*.

The toner accommodated in the toner accommodation portion 71*a* is then discharged from the discharge opening 71*b*. The toner discharged from the discharge opening 71*b* is accommodated into the developing accommodation portion 53*a* via the reception opening 53*b*. The toner accommodated in the developing accommodation portion 53*a* is supplied to the developing roller 51 by the supply roller 52. Through such a route, the toner accommodated in the toner accommodation portion 71*a* is supplied to the developing roller 51.

The toner cartridge 70 desirably includes a not-illustrated sealing member (first sealing member) to cover the discharge opening 71*b*. The developing unit 50 desirably includes a not-illustrated sealing member (second sealing member) to cover the reception opening 53*b*.

In a state where the toner cartridge 70 is not attached to the developing unit 50, the discharge opening 71*b* and the reception opening 53*b* are desirably covered with the respective sealing members so that toner leakage from the discharge opening 71*b* and the reception opening 53*b* is prevented.

(Image Forming Operation)

An image forming operation according to the present embodiment will be described. The photosensitive drum 2 is initially rotated in the direction of the arrow in FIG. 1 (counterclockwise) in synchronization with the rotation of the intermediate transfer belt 10*a*. The surface of the photosensitive drum 2 is uniformly charged by the charging roller 3.

In the case of forming a color image on a sheet S, as will be described below, the rotary main body 90 supporting the developing units 50*y*, 50*m*, 50*c*, and 50*k* rotates in the direction of the arrow in FIG. 1 (clockwise). The developing rollers 51*y*, 51*m*, 51*c*, and 51*k* are moved to a developing position one by one, and electrophotographic processes are repeated.

Initially, the scanner 4 emits laser light based on image data corresponding to a yellow image, whereby an electrostatic latent image corresponding to the yellow image is formed on the surface of the photosensitive drum 2. In parallel with the formation of the electrostatic latent image, the motor M1 rotates the rotary main body 90 to bring the rotary main body 90 into the yellow developing orientation. When the rotary main body 90 is in the yellow developing orientation, the developing roller 51*y* is at the developing position and develops the electrostatic latent image formed on the photosensitive drum 2 with yellow toner.

In the present embodiment, each of the developing rollers 51*y*, 51*m*, 51*c*, and 51*k* is an elastic roller that is a metal shaft coated with rubber. At the developing position, each of the developing rollers 51*y*, 51*m*, 51*c*, and 51*k* develops an electrostatic latent image in contact with the photosensitive drum 2. In other words, the image forming apparatus 1 according to the present embodiment uses a contact developing method. However, each of the developing rollers 51*y*, 51*m*, 51*c*, and 51*k* may develop the electrostatic latent image at the developing position across a gap from the photosensitive drum 2. In other words, the image forming apparatus 1 may employ a contactless developing method.

With the yellow toner image developed, the yellow toner image on the photosensitive drum 2 is primarily transferred to the intermediate transfer belt 10*a* by the primary transfer roller 11 located inside the intermediate transfer belt 10*a*.

The rotary main body 90 is subsequently rotated to move the developing rollers 51*m*, 51*c*, and 51*k* to the developing position in succession, whereby respective color toner images are formed. More specifically, after the formation of the yellow toner image on the intermediate transfer belt 10*a*, the rotary main body 90 assumes the magenta developing orientation, and a magenta toner image is formed on the intermediate transfer belt 10*a*. After the formation of the magenta toner image on the intermediate transfer belt 10*a*, the rotary main body 90 assumes the cyan developing orientation, and a cyan toner image is formed on the intermediate transfer belt 10*a*. After the formation of the cyan toner image on the intermediate transfer belt 10*a*, the rotary main body 90 assumes the black developing orientation, and a black toner image is formed on the intermediate transfer belt 10*a*. After the formation of the black toner image on the intermediate transfer belt 10*a*, the rotary main body 90 rotates about the rotation axis 90C in the direction of the arrow illustrated in FIG. 1 (clockwise) and returns to the yellow developing orientation. Note that the first image to be formed on the intermediate transfer belt 10*a* may be of any color. For example, a black toner image may be formed first.

The primary transfer is repeated so that the four color toner images are superposed on the intermediate transfer belt 10*a*, whereby a color image is formed on the intermediate transfer belt 10*a*. The secondary transfer roller 12 and the cleaning device 13 are kept out of contact with the intermediate transfer belt 10*a* until the color image is formed on the intermediate transfer belt 10*a*.

Meanwhile, sheets S are fed from the sheet storage unit 300 located in the lower part of the apparatus main body 1A by the pickup roller 310. The sheets S are separated one by one by the feed roller 311 and the separation roller 312, and fed to the conveyance roller pair 320. The conveyance roller pair 320 delivers the fed sheet S to a transfer portion (secondary transfer portion) that is the nip portion between the intermediate transfer belt 10*a* and the secondary transfer roller 12. The color image on the intermediate transfer belt 10*a* is transferred (secondarily transferred) to the surface of the conveyed sheet S.

The sheet S to which the color image is transferred is conveyed to the fixing device 40. In the fixing device 40, the sheet S is heated and pressurized, whereby the image is fixed to the sheet S. The sheet S past the fixing device 40 is discharged out of the image forming apparatus 1 as a product.

Now, in the case of forming a monochrome image, the rotary main body 90 assumes the black developing orientation. In this state, the photosensitive drum 2 is charged and exposed to form an electrostatic latent image on the surface of the photosensitive drum 2. The electrostatic image is then developed with black toner by the developing roller 51*k* located at the developing position. The black toner image is primarily transferred to the intermediate transfer belt 10*a*, and then secondarily transferred to the sheet S. The subsequent steps are similar to the case of a color image.

(Rotary Configuration)

A configuration of the rotary main body 90 will be described with reference to FIGS. 1, 4A, 4B, and 5.

Figure 4A:
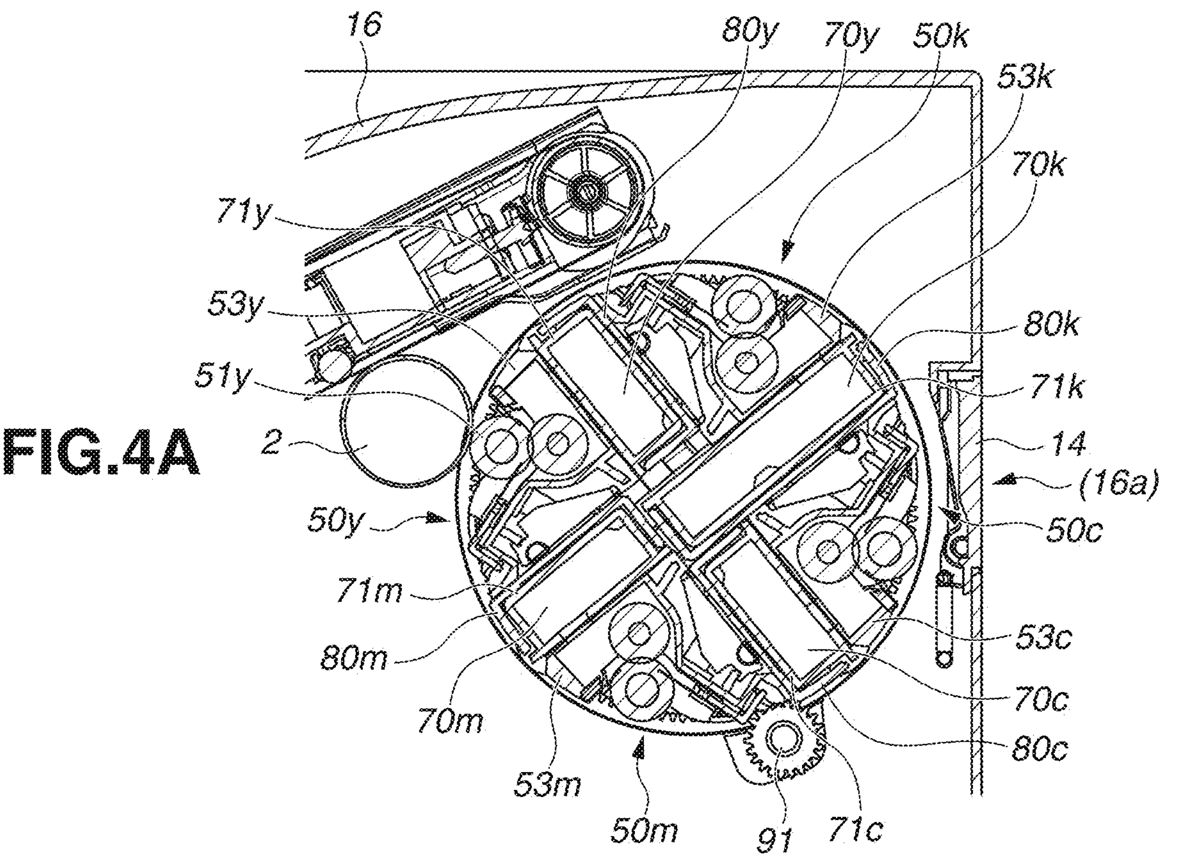
FIGS. 4A and 4B are sectional views of the image forming apparatus according to the first embodiment.
Figure 4B:
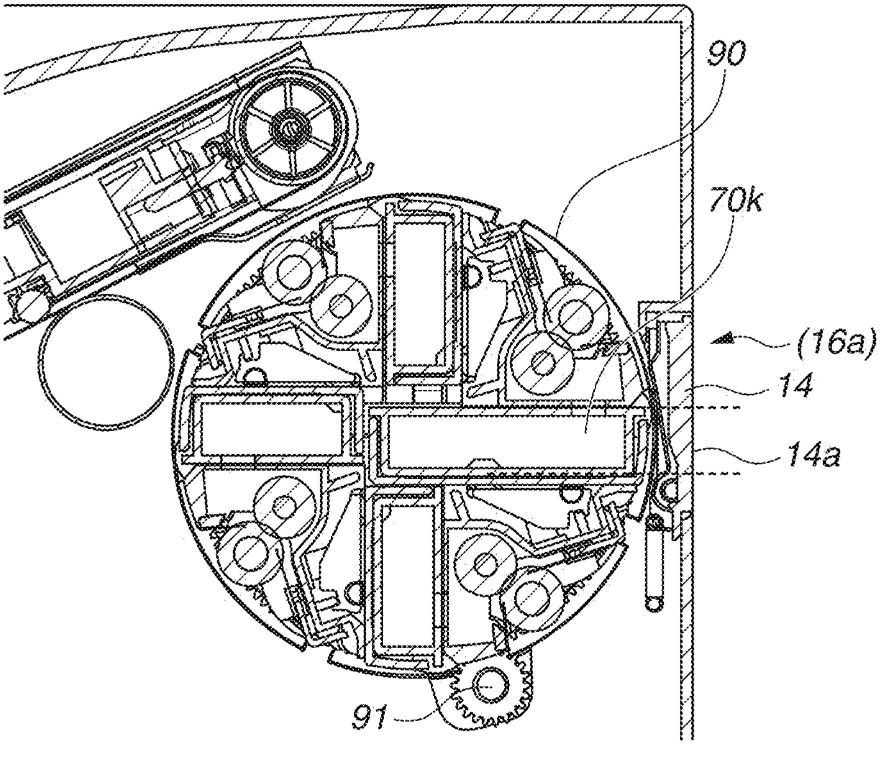
Figure 5:
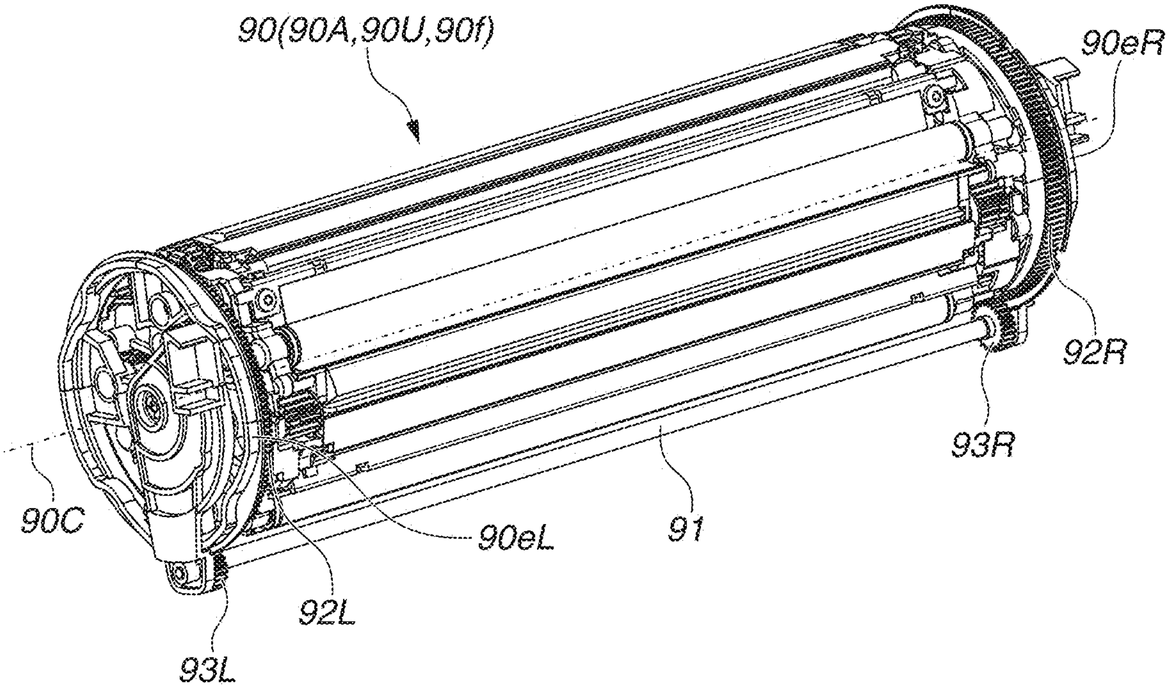
FIG. 5 is a perspective view of a rotary main body according to the first embodiment.

FIGS. 4A and 4B are sectional views illustrating the rotary main body 90 of the image forming apparatus 1 and its vicinity. FIGS. 4A and 4B are sectional views of the image forming apparatus 1, taken along an imaginary plane perpendicular to the rotation axis 90C of the rotary main body 90. FIG. 5 is a perspective view of the rotary main body 90.

As described above, the toner cartridges 70*y* to 70*k* are detachably attachable to the rotary main body 90. The user can replenish the image forming apparatus 1 with toner by replacing the toner cartridges 70*y* to 70*k* when the toner cartridges 70*y* to 70*k* run out of toner.

As illustrated in FIG. 1, the apparatus main body 1A includes a frame 16 that accommodates the rotary main body 90.

The frame 16 a main body frame of the image forming apparatus 1 according to the present embodiment. The frame 16 is a housing (skeleton) of the apparatus main body 1A, constituted by frames and exterior members. In the present embodiment, the frame 16 has a substantially rectangular solid shape.

The frame 16 has an opening 16*a*. More specifically, the frame 16 includes a side surface extending in a direction intersecting the horizontal direction. The side surface constitutes at least a part of an exterior surface of the apparatus main body 1A on the +X side. The opening 16*a* is located in this side surface. In a discharge direction in which image-formed sheets S are discharged from a discharge port of the apparatus main body 1A, the side surface is the side surface located downstream of the discharge port. The user can access the sheet storage unit 300 to replenish sheets S and take out sheets S discharged from the discharge port from the side surface side of the image forming apparatus 1. The side surface can thus be referred to as the front (front surface) of the apparatus main body 1A.

The toner cartridges 70*y*, 70*m*, 70*c*, and 70*k* can be detached from and attached to the rotary main body 90 through the opening 16*a*. In other words, the toner cartridge 70*k* can be said to be an example of the first toner cartridge that accommodates toner to be supplied to the first developing roller (developing roller 51*k*) and can be detachably attached to the rotary (rotary main body 90) through the opening 16*a* of the frame 16 of the apparatus main body 1A. The toner cartridge 70*m* can be said to be an example of the second toner cartridge that accommodates toner to be supplied to the second developing roller (developing roller 51*m*) and can be detachably attached to the rotary (rotary main body 90) through the opening 16*a* of the frame 16 of the apparatus main body 1A.

In the present embodiment, the toner cartridges 70*y*, 70*m*, 70*c*, and 70*k* are detached from and attached to the rotary main body 90 through the opening 16*a* as being supported by the trays 80*y*, 80*m*, 80*c*, and 80*k*.

To put it in another way, the user can detach and attach the toner cartridges 70*y* to 70*k* from/to the rotary main body 90 via the trays 80*y* to 80*k*.

The opening 16*a* is located in the side surface of the frame 16. In the present embodiment, the side surface is a surface substantially parallel to the rotation axis 90C of the rotary main body 90. When a toner cartridge 70 is replaced, the toner cartridge 70 therefore passes through the opening 16*a* in a direction intersecting (desirably, a direction orthogonal to) the rotation axis 90C.

The image forming apparatus 1 includes a door 14 that covers the opening 16*a* of the frame 16. The door 14 is an openable and closable member that can move to a closed position where the door 14 covers the opening 16*a* (see also FIG. 6A) and an open position where the opening 16*a* is exposed (see also FIGS. 6B and 6C).

As described above, in the present embodiment, the toner cartridge 70 is configured to be detachably attachable to the rotary main body 90 via the tray 80. This enables stable detachment and attachment of the toner cartridge 70 from/to the rotary main body 90.

More specifically, the user can replace the toner cartridge 70 through the operation of detaching and attaching the toner cartridge 70 from/to the tray 80 that is configured to be movable relative to the rotary main body 90 (i.e., with respect to the apparatus main body 1A). In a configuration where the user replaces a toner cartridge by directly inserting and removing the toner cartridge into/from an apparatus main body, the user would need to insert the toner cartridge up to a predetermined attached position inside the apparatus main body. In the present embodiment, the tray 80 supporting the toner cartridge 70 can move so that the toner cartridge 70 moves to the attached position. The user can thus replace the toner cartridge 70 by a simple operation of placing the toner cartridge 70 on the tray 80, with improved operability.

The toner cartridge 70 has an elongated shape with the Y direction parallel to the rotation axis 90C of the rotary main body 90 as its longitudinal direction. In other words, the longitudinal dimension of the toner cartridge 70 is greater than the height and width in a cross section orthogonal to the longitudinal direction. In handling the toner cartridge 70 of such an elongated shape, the toner cartridge 70 can be passed through the opening 16*a* with a short moving distance if the opening 16*a* is located in the side surface of the frame 16 substantially parallel to the longitudinal direction (Y direction) of the toner cartridge 70. This facilitates the replacement of the toner cartridge 70 as compared to, for example, a case where the toner cartridge 70 is inserted and removed through an opening located in a side surface on one side (+Y side or −Y side) of the frame 16 in the longitudinal direction of the toner cartridge 70.

The rotary main body 90 can rotate about the rotation axis 90C to assume replacement orientations where one of the toner cartridges 70*y* to 70*k* can be detached from the rotary main body 90. The orientation in which the toner cartridge 70*y* can be detached will be referred to as a yellow replacement orientation. The orientation in which the toner cartridge 70*m* can be detached will be referred to as a magenta replacement orientation. The orientation in which the toner cartridge 70*c* can be detached will be referred to as a cyan replacement orientation.

The orientation in which the toner cartridge 70*k* can be detached will be referred to as a black replacement orientation.

The black replacement orientation is an example of a first replacement orientation where the first toner cartridge can be detached from the rotary main body 90. The yellow, magenta, and cyan replacement orientations are examples of a second replacement orientation where the second toner cartridge can be detached from the rotary main body 90. The yellow, magenta, cyan, and black replacement orientations may be referred to as first to fourth replacement orientations. Such numbering is used for the convenience of description only, and in principle can be interchanged as appropriate.

The rotary main body 90 can rotate about the rotation axis 90C clockwise in FIG. 1 and assume the yellow, magenta, cyan, and black replacement orientations in succession. In the present embodiment, the rotary main body 90 alternates the developing and replacement orientations by rotating about the rotation axis 90C clockwise in FIG. 1. For example, in FIG. 1, the rotary main body 90 is in the black developing orientation. When the rotary main body 90 rotates clockwise from this state, the rotary main body 90 switches orientations in order of the cyan replacement orientation, the yellow developing orientation, the black replacement orientation, the magenta developing portion, the yellow replacement orientation, the cyan developing orientation, and the magenta replacement orientation. When the rotary main body 90 in the magenta replacement orientation rotates clockwise, the rotary main body 90 returns to the black developing orientation. That is, the rotary main body 90 can rotate one turn (360°) or more clockwise.

FIG. 4A illustrates a cross section of the rotary main body 90 in a developing orientation (specifically, the yellow developing orientation). FIG. 4B illustrates a cross section of the rotary main body 90 in a replacement orientation (specifically, the black replacement orientation).

As illustrated in FIGS. 4A and 4B, the four trays 80*y* to 80*k* are attached to the rotary main body 90. The trays 80*y* to 80*k* hold the respective toner cartridges 70*y* to 70*k*. In FIGS. 4A and 4B, the trays 80*y* to 80*k* are accommodated inside the rotary main body 90. Such a state can be said to be where the toner cartridges 70*y* to 70*k* are attached to the developing units 50*y* to 50*k*.

As described above, the toner cartridge 70 can move to the attached position and the retracted position retracted from the attached position, relative to the developing frame 53 of the developing unit 50. Specifically, the first toner cartridge (toner cartridge 70*k*) can move to a first attached position and a first retracted position relative to the first accommodation frame (developing frame 53*k*). The second toner cartridge (toner cartridge 70*m*) can move to a second attached position and a second retracted position relative to the second accommodation frame (developing frame 53*m*).

With the toner cartridge 70 at the attached position relative to the developing frame 53, as illustrated in FIG. 3, the discharge opening 71*b* and the reception opening 53*b* are opposed to each other. The toner cartridge 70 is configured so that the toner is supplied to the developing accommodation portion 53*a* through the reception opening 53*b* (opening in the accommodation frame) in such a state.

The apparatus main body 1A includes a moving device configured to move the toner cartridge 70 from the attached position to the retracted position relative to the rotary main body 90 (more specifically, relative to the developing frame 53 of the developing unit 50). The moving device will be described below with reference to FIG. 8. The rotary main body 90 includes a plurality of moving devices corresponding to the plurality of toner cartridges 70*y* to 70*k*. The trays 80*y* to 80*k* can be said to be parts of the moving devices.

In the present embodiment, the toner cartridge 70*k* accommodating the black toner is larger in size and can accommodate more toner than the toner cartridges 70*y* to 70*c* accommodating the yellow toner, magenta toner, and cyan toner. In other words, the first toner cartridge can accommodate a first amount of toner, the second toner cartridge can accommodate a second amount of toner, and the first amount can be said to be greater than the second amount.

Specifically, the length of the black toner cartridge 70*k* in a first radial direction with respect to the rotation axis 90C of the rotary main body 90 is greater than the length of the magenta toner cartridge 70*m* in a second radial direction. As employed herein, the first radial direction refers to the radial direction of rotation of the rotary main body 90 (radial direction of an imaginary circle around the rotation axis 90C) in which the toner cartridge 70*k* extends with respect to the rotation axis 90C when viewed in the direction of the rotation axis 90C. The second radial direction refers to the radial direction of rotation of the rotary main body 90 in which the toner cartridge 70*m* extends with respect to the rotation axis 90C when viewed in the direction of the rotation axis 90C. Similarly, the length of the black toner cartridge 70*k* in the first radial direction is greater than the lengths of the other toner cartridges 70*y* and 70*c* in the radial directions corresponding to the toner cartridges 70*y* and 70*c*.

The tray 80*k* holding the black toner cartridge 70*k* is thus larger in size than the trays 80*y*, 80*c*, and 80*k* holding the other toner cartridges 70*y*, 70*m*, and 70*c*. That is, the rotary main body 90 includes the four toner cartridges 70*y* to 70*k* and trays 80*y* to 80*k* of different sizes. In other words, the toner cartridge 70*k* as an example of the first toner cartridge and the toner cartridge 70*y* as an example of the second toner cartridge smaller in size than the first toner cartridge can be detachably attached to the rotary main body 90. The rotary main body 90 includes, accordingly, the tray 80*k* as an example of the first support member that supports the first toner cartridge and the tray 80*y* as an example of the second support member smaller in size than the first support member. Moreover, the toner cartridges 70*m* and 70*c* as examples of the third toner cartridge and the fourth toner cartridge smaller in size than the first toner cartridge can be detachably attached to the rotary main body 90. The rotary main body 90 includes, accordingly, the trays 80*m* and 80*c* as examples of the third support member and the fourth support member smaller in size than the first support member.

Now, rotational driving of the rotary main body 90 will be described with reference to FIG. 5. As illustrated in FIG. 5, disc gears 92L and 92R are formed on both ends of the rotary main body 90. Moreover, rotary drive gears 93L and 93R are coupled to both ends of a swing shaft 91 in a manner capable of drive transmission. The driving force of the motor M1 is transmitted to the rotary drive gear 93R by a drive transmission mechanism. The rotary drive gears 93L and 93R then transmit the driving force to the disc gears 92L and 92R, whereby the rotary main body 90 is driven to rotate. The rotary main body 90 rotates about the rotation axis 90C clockwise in FIG. 1.

The rotary main body 90 is supported to be swingable about the swing shaft 91. The rotary main body 90 is biased about the swing shaft 91 counterclockwise in FIGS. 4A and 4B by a not-illustrated biasing member. This direction can be said to be one in which each of the developing rollers 51*y* to 51*k* approaches the photosensitive drum 2. As a result, when the rotary main body 90 assumes the developing orientations, the respective developing rollers 51*y* to 51*k* come into contact with the photosensitive drum 2.

As illustrated in FIG. 5, rotary cams 90*e*L and 90*e*R are disposed on both ends of the rotary main body 90. When the rotary main body 90 rotates about the rotation axis 90C clockwise in FIGS. 4A and 4B, the rotary cams 90*e*L and 90*e*R come into contact with rollers (not illustrated) supported by the frame 16. The rotary main body 90 then moves about the swing shaft 91 clockwise in FIGS. 4A and 4B. This direction can be said to be one in which each of the developing rollers 51*y* to 51*k* moves away from the photosensitive drum 2. This direction can also be said to be one in which the rotary main body 90 approaches the opening 16*a* of the frame 16 and the door 14.

When the rotary main body 90 rotates and switches from a developing orientation to a replacement orientation, the rotary main body 90 thus swings about the swing shaft 91. With the rotary main body 90 in a replacement orientation, the developing roller 51 is separated from the photosensitive drum 2.

As illustrated in FIG. 4B, in the black replacement orientation, the toner cartridge 70*k* stops at a position opposed to the opening 16*a* formed in the side surface of the apparatus main body 1A and the door 14. When the tray 80*k* is slid from the attached position in the developing unit 50*k* to outside the rotary main body 90, the user can replace the toner cartridge 70*k*.

(Toner Cartridge Replacement Operation)

Figure 6A:
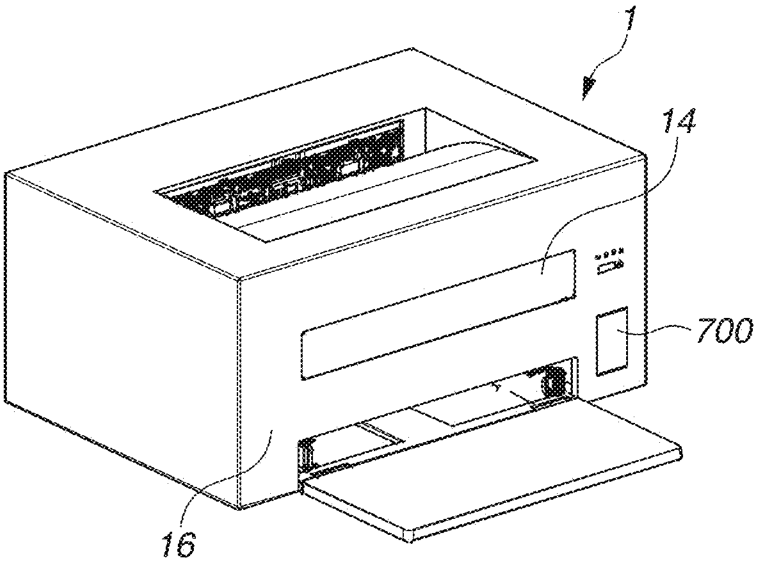
FIG. 6A to 6C are perspective views of the image forming apparatus according to the first embodiment.
Figure 6B:
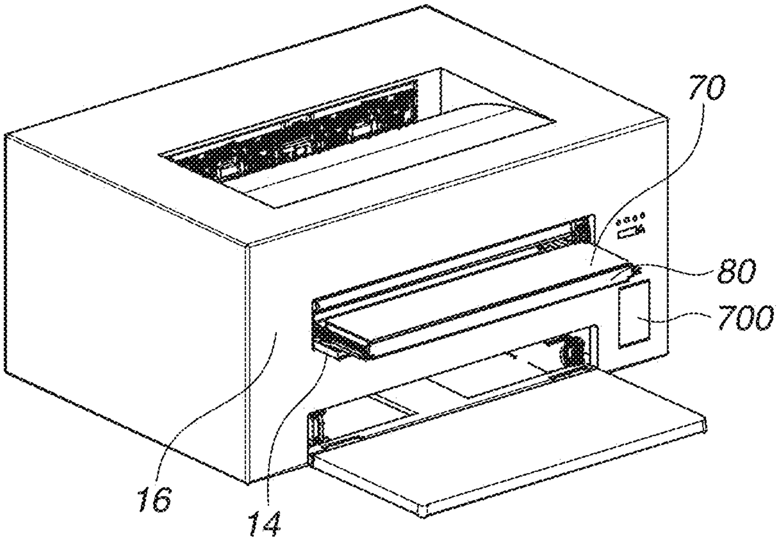
Figure 6C:
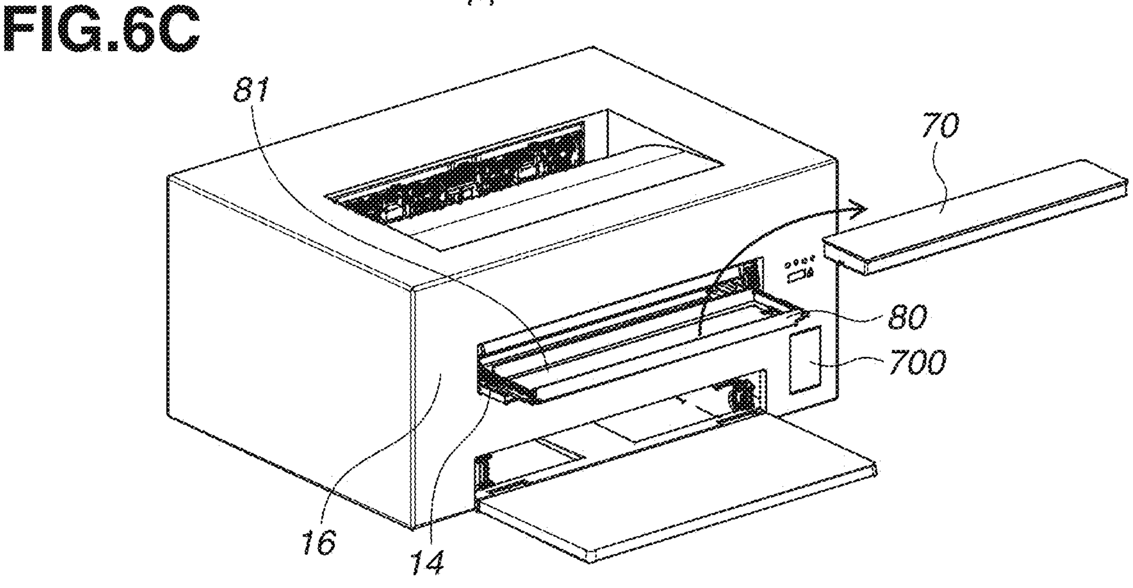
Figure 7A:
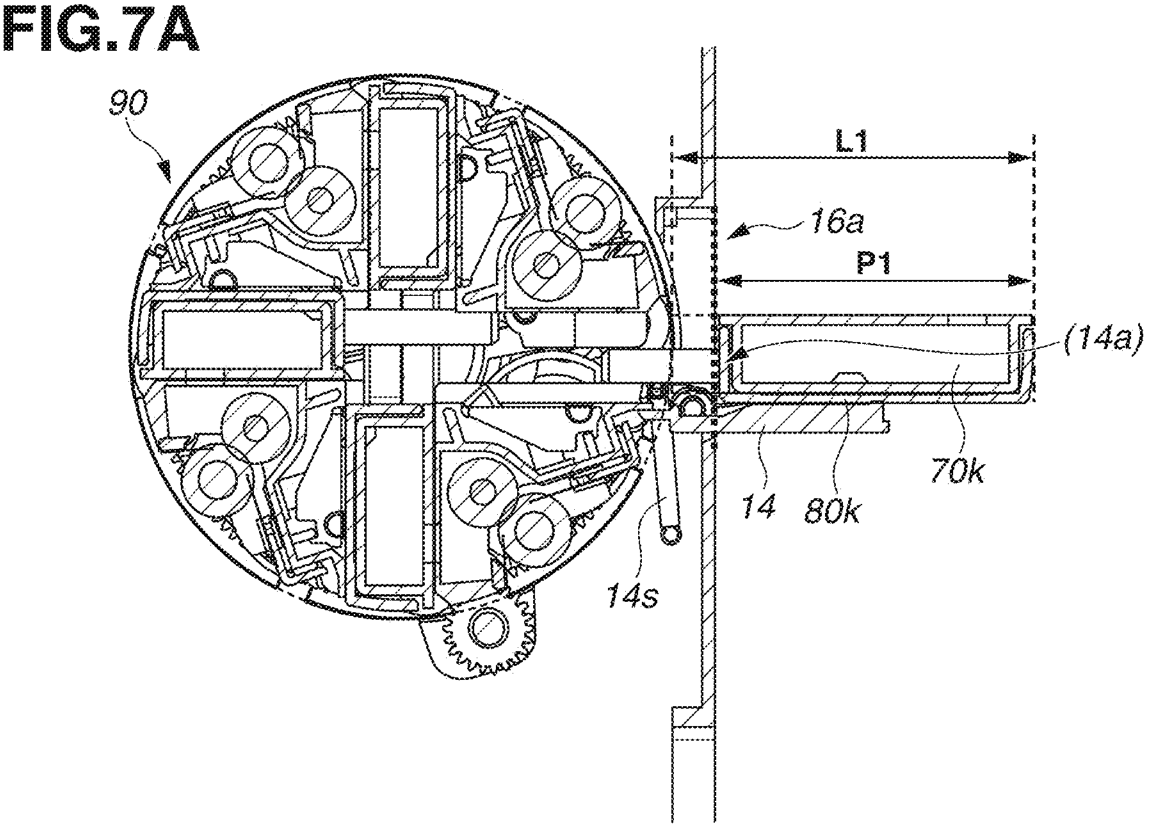
FIGS. 7A and 7B are sectional views of the image forming apparatus according to the first embodiment.
Figure 7B:
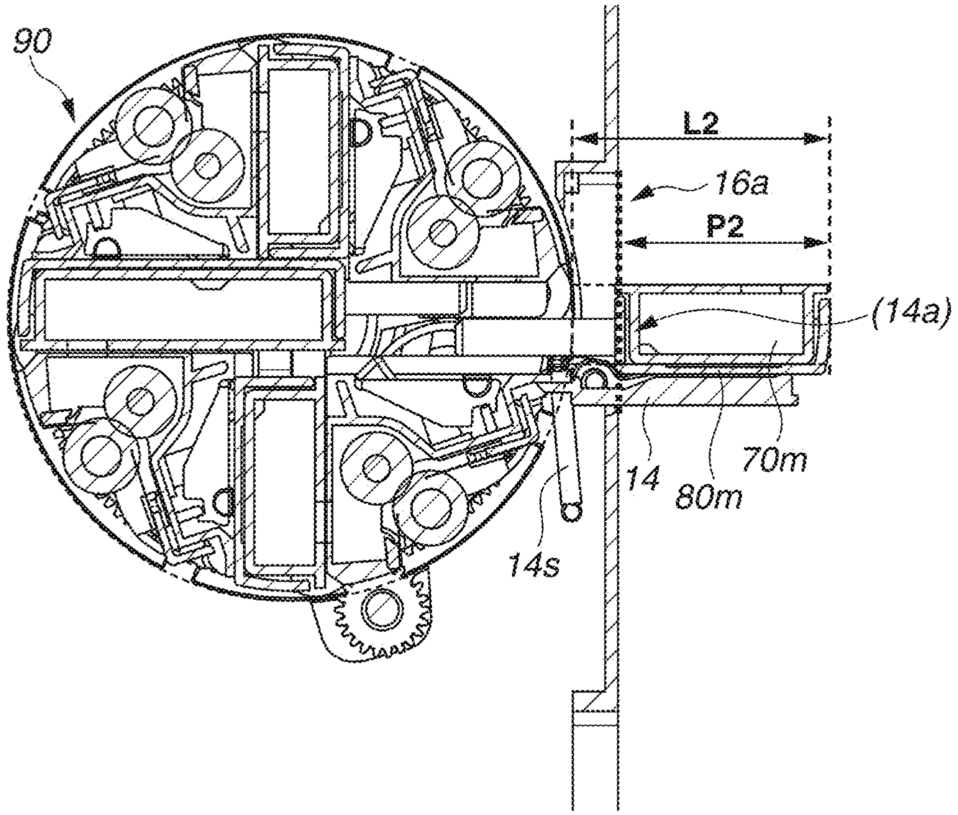

A toner cartridge replacement operation will be described with reference to FIGS. 4A, 6A to 6C, 7A, and 7B. FIGS. 6A to 6C are external views of the apparatus main body 1A. FIGS. 7A and 7B are sectional views of the vicinity of the rotary main body 90 during toner cartridge replacement. FIGS. 7A and 7B are sectional views of the image forming apparatus 1 in an imaginary plane perpendicular to the rotation axis 90C of the rotary main body 90.

FIG. 6A illustrates the appearance of the apparatus main body 1A during an image forming operation or in a standby state. During an image forming operation refers to a period during which the image forming apparatus 1 performs a series of operations including feeding a sheet S, forming an image on the sheet S, and then discharging the sheet S as a product. The standby state refers to a state where the image forming apparatus 1 can start the image forming operation upon reception of an image formation instruction (print instruction) and is waiting for an image formation instruction from the user. As illustrated in FIG. 6A, the door 14 is closed during the image forming operation or in the standby state.

FIG. 6B illustrates the appearance of the apparatus main body 1A during toner cartridge replacement. During toner cartridge replacement, the door 14 is open, and the tray 80 and the toner cartridge 70 are moved to outside the apparatus main body 1A.

The toner cartridge 70 can be moved to the attached position and the retracted position retracted from the attached position, relative to the developing frame 53 of the developing unit 50. With the toner cartridge 70 at the attached position relative to the developing frame 53, as illustrated in FIG. 3, the discharge opening 71*b* and the reception opening 53*b* are opposed to each other. As illustrated in FIGS. 4A and 4B, the rotary main body 90 is configured to rotate about the rotation axis 90C and assume the developing orientation and replacement orientation with the toner cartridge 70 at the attached position.

A toner cartridge replacement operation will be described. Initially, the user issues an instruction for the toner cartridge replacement operation to a control unit of the apparatus main body 1A. For example, the user issues the instruction for the toner cartridge replacement operation by making an input via an operation panel (operation unit) disposed on the apparatus main body 1A.

When the control unit receives the instruction for the toner cartridge replacement operation, the rotary main body 90 rotates to the replacement orientation of the toner cartridge 70 to be replaced (toner cartridge 70 run out of toner) and stops. Specifically, the control unit rotates the rotary main body 90 to the replacement orientation of the toner cartridge specified by the instruction for the toner cartridge replacement operation (in FIG. 4B, the black replacement orientation for replacing the black toner cartridge 70*k*). In the replacement orientation, the tray 80 supporting the toner cartridge 70 instructed to be replaced is opposed to the opening 16*a* of the frame 16 of the apparatus main body 1A.

For example, the rotary main body 90 of FIG. 4A is in the yellow developing orientation where the yellow developing roller 51*y* is opposed to the photosensitive drum 2. Here, the black toner cartridge 70*y* and tray 80*k* do not need to be opposed to the opening 16*a* or the door 14. In other words, when the rotary main body 90 is in a replacement orientation other than that of the intended toner cartridge 70 or in a developing orientation, the toner cartridge 70 and the tray 80 do not need to be opposed to the opening 16*a* or the door 14. The opening 16*a* can therefore have a size enough for a single toner cartridge 70 to pass through. When the rotary main body 90 rotates from the yellow developing orientation by a predetermined angle clockwise in the diagram, as illustrated in FIG. 4B, the black toner cartridge 70*k* and tray 80*k* are opposed to the opening 16*a* and the door 14.

As employed herein, "a tray 80 is opposed to the opening 16*a*" means that the tray 80 is located to be movable to outside the apparatus main body 1A via the opening 16*a*. More specifically, when the tray 80 is opposed to the opening 16*a*, the tray 80 can be moved outward in the radial direction of rotation of the rotary main body 90 by a moving mechanism to be described below, so that the tray 80 and the toner cartridge 70 supported by the tray 80 protrude from the apparatus main body 1A. In FIG. 4A, none of the trays 80*y* to 80*k* is opposed to the opening 16*a*. In FIG. 4B, only the black tray 80*k* is opposed to the opening 16*a*, and the other trays 80*y* to 80*c* are not opposed to the opening 16*a*.

With the rotary main body 90 positioned to the replacement orientation, the motor M2 moves the tray 80 supporting the toner cartridge 70 to be replaced to outside the apparatus main body 1A.

The toner cartridge 70 to be replaced is thereby moved from the attached position to the retracted position relative to the rotary main body 90. As illustrated in FIGS. 6B, 6C, 7A, and 7B, the tray 80 and the toner cartridge 70 to be replaced, supported by the tray 80, protrude from the apparatus main body 1A via the opening 16*a*.

More specifically, the tray 80 can be moved to an accommodation position and a detachment position relative to the rotary main body 90. The accommodation position is a position where the tray 80 is accommodated within the rotary main body 90. The detachment position is the position where the tray 80 protrudes from the rotary main body 90 and the toner cartridge 70 can be detached from the tray 80 (removal position, replaceable position). Examples of the detachment position include the positions of the tray 80 in FIGS. 6B and 6C, the tray 80*k* in FIG. 7A, and the tray 80*m* in FIG. 7B.

When the tray 80 is at the accommodation position, the toner cartridge 70 attached to the tray 80 is located at the attached position. When the tray 80 is at the detachment position, the toner cartridge 70 attached to the tray 80 is located at the retracted position.

The rotary main body 90 includes a not-illustrated protrusion for holding the tray 80 at the accommodation position and holding the toner cartridge 70 at the attached position. The tray 80 has a not-illustrated recess to be fitted onto the protrusion. The protrusion and the recess are provided for each of the trays 80*y* to 80*k*. The protrusion is desirably biased in a direction to engage with the recesses.

The fitting of the protrusion to the recess of the tray 80 locks the tray 80 to the rotary frame 90*f*. The tray 80 is thereby retained at the accommodation position even during the rotation of the rotary main body 90, and the toner cartridge 70 is prevented from moving from the attached position. When the tray 80 is moved between the accommodation position and detachment position by the moving device to be described below, the protrusion can be moved by the tray 80 and disengaged from the recess.

In the present embodiment, the door 14 is supported to be rotatable relative to the apparatus main body 1A. As illustrated in FIG. 7A, the door 14 is biased from the open position to the closed position by a spring 14*s*. The spring 14*s* is a tension spring, for example, and biases the door 14 to produce counterclockwise moment in FIGS. 7A and 7B about a spindle 14*c* of the door 14.

The door 14 is pushed open by the tray 80 (the state of FIG. 6B). This state can be said to be where the tray 80 is supported by the door 14. The door 14 supports at least a part of the tray 80 protruding from the apparatus main body 1A, whereby the toner cartridge 70 can be more stably supported. In other words, when the first toner cartridge (toner cartridge 70*k*) is at the first retracted position, the openable and closable member (door 14) at the open position supports the first support member (tray 80*k*). When the second toner cartridge (toner cartridges 70*y* to 70*c*) is at the second retracted position, the openable and closable member (door 14) at the open position supports the second support member (trays 80*y* to 80*c*).

The door 14 is configured to come into contact with a part of the frame 16 of the apparatus main body 1A (for example, a lower edge 16*c* of the opening 16*a*) at the open position and not rotate downward beyond the open position. When the tray 80 is retracted from outside to inside the apparatus main body 1A, the door 14 returns to the closed position due to the biasing force of the spring 14*s*.

The toner cartridge 70 is detachably held by the tray 80. As illustrated in FIG. 6C, the user can thus perform the operation of detaching the toner cartridge 70 from the tray 80 and attaching a new toner cartridge 70 (replacement operation). To replace a plurality of toner cartridges 70, the replacement operation can be performed by repeating the foregoing operations.

FIGS. 7A and 7B illustrate cross sections of the vicinity of the rotary main body 90 during toner cartridge replacement.

FIG. 7A illustrates a state when the black toner cartridge 70*k* is replaced. FIG. 7B illustrates a state when the magenta toner cartridge 70*m* is replaced.

The image forming apparatus 1 includes not-illustrated moving devices for moving the toner cartridges 70 from the attached positions to the retracted positions. In the present embodiment, the moving devices can be said to include the trays 80. The moving device including the tray 80*k* can be said to be an example of a first moving device including the first support member. The moving device including the tray 80*m* can be said to be an example of a second moving device including the second support member.

Even with the toner cartridge 70 at the retracted position, the tray 80 remains coupled to the rotary main body 90 (supported by the rotary main body 90). To facilitate the operation of detaching the toner cartridge 70 from the rotary main body 90, the protruding length of the toner cartridge 70 at the retracted position from the rotary main body 90 is desirably large. Since the toner cartridge 70 is configured to be detachably attachable to the rotary main body 90 via the tray 80, the toner cartridge 70 can be stably supported by the tray 80 even if the protruding length of the toner cartridge 70 from the rotary main body 90 is large.

The moving direction of the toner cartridge 70 when the toner cartridge 70 moves from the attached position to the retracted position will be referred to as a retraction direction. In the present embodiment, the retraction direction of the toner cartridge 70 is a direction intersecting the direction of the rotation axis 90C (Y direction). As illustrated in FIGS. 7A and 7B, when viewed in the direction of the rotation axis 90C (Y direction), the retraction direction of the toner cartridge 70 is therefore a direction orthogonal to the direction of the rotation axis 90C (Y direction). The retraction direction of the toner cartridge 70 can be said to be an outward direction (direction away from the rotation axis 90C) among the radial directions of rotation of the rotary main body 90.

As illustrated in FIGS. 7A and 7B, for the user to perform the operation of detaching the toner cartridge 70 from the rotary main body 90, at least a part of the toner cartridge 70 desirably protrudes from the rotary main body 90 in detaching the toner cartridge 70. In the present embodiment, when the toner cartridge 70 is at the retracted position, the entire toner cartridge 70 protrudes from the rotary main body 90.

When the rotary main body 90 rotates about the rotation axis 90C, the rotation path of the rotary main body 90 can be said to match the circumscribed circle of the rotary main body 90 about the rotation axis 90C (not-illustrated imaginary circle). When the toner cartridge 70 is at the retracted position, one half or more of the length of the toner cartridge 70 in the retraction direction is desirably located outside the rotation path of the rotary main body 90. More specifically, when the toner cartridge 70 at the retracted position is viewed in the rotation axis direction of the rotary, one half or more of the entire length of the toner cartridge 70 in the moving direction of the toner cartridge from the attached position to the retracted position is desirably located outside the rotation path of the rotary. This applies to all the toner cartridges 70, including the toner cartridge 70*k* as an example of the first cartridge and the toner cartridge 70*m* as an example of the second cartridge. In the present embodiment, when the toner cartridge 70 is at the retracted position, the entire toner cartridge 70 is located outside the rotation path (imaginary circle) of the rotary main body 90.

To facilitate the user's grip of the toner cartridge 70, at least a part of the toner cartridge 70 is desirably located on the outside of the image forming apparatus 1 (outside of the apparatus main body 1A) when the toner cartridge 70 is at the retracted position. As employed herein, "the outside of the apparatus" refers to the space outside the image forming apparatus 1 (outside the apparatus main body 1A) when the image forming apparatus 1 is in use, such as during the image forming operation on sheets S.

In the present embodiment, the exterior surfaces of the apparatus main body 1A are constituted by the exterior surfaces of the frame 16. In other words, the outside of the apparatus can be said to be the outside of the frame 16. The state where at least a part of the toner cartridge 70 is located on the outside of the apparatus can therefore be said to be where at least a part of the toner cartridge 70 protrudes from the opening 16*a* of the frame 16 of the apparatus main body 1A to outside the frame 16.

In the present embodiment, when the door 14 is at the closed position, the opening 16*a* of the frame 16 of the apparatus main body 1A is covered with the door 14. The exterior surface 14*a* of the door 14 at the closed position constitutes a part of the exterior surfaces of the apparatus main body 1A. In such a case, the outside of the apparatus refers to the outside of the exterior surface 14*a* of the door 14 at the closed position. More specifically, with the position of the exterior surface 14*a* of the door 14 at the closed position as an exterior position, at least a part of the toner cartridge 70 at the retracted position is located outside the apparatus main body 1A compared to the exterior position.

To put it in another way, if the door 14 is at the open position, at least a part of the toner cartridge 70 is located in the space outside the apparatus main body 1A. The at least part of the toner cartridge 70 is located downstream of the exterior position in the retraction direction of the toner cartridge 70.

With the side surface where the opening 16*a* is located as the front of the apparatus main body 1A, at least a part of the toner cartridge 70 at the retracted position can be said to protrude forward from the exterior surface of the apparatus main body 1A on the front side. In such a case, the user can easily access the toner cartridge 70 from the front side of the image forming apparatus 1 and perform the replacement operation of the toner cartridge 70.

When the toner cartridge 70 is at the retracted position, one half or more of the length of the toner cartridge 70 in the retraction direction is desirably located on the outside of the apparatus. More specifically, when viewed in the rotation axis direction of the rotary, one half or more of the entire length of the toner cartridge 70 at the retracted position is desirably located outside the main body frame in the moving direction of the toner cartridge 70 from the attached position to the retracted position. This applies to all the toner cartridges 70, including the toner cartridge 70*k* as an example of the first cartridge and the toner cartridge 70*m* as an example of the second cartridge. When the toner cartridge 70 is at the retracted position, the entire toner cartridge 70 is more desirably located on the outside of the apparatus. In the present embodiment, the exterior surface of the apparatus main body 1A on the front side is constituted by the exterior surface 14*a* of the door 14 and the side surface. However, the configuration of the door 14 is not limited thereto. For example, the door 14 may have a size to cover the entire side surface. In such a case, the exterior surface of the apparatus main body 1A on the front side is constituted by the exterior surface 14*a* of the door 14.

The tray 80 includes a cartridge holding portion 81 (see FIGS. 3 and 6C) that holds the toner cartridge 70. The cartridge holding portion 81 is a to-be-attached portion to which the toner cartridge 70 is attached. When the tray 80 is at the detachment position, the entire cartridge holding portion 81 is desirably located outside the rotation path of the rotary main body 90 in the retraction direction. When the tray 80 is at the detachment position, one half or more of the length of the cartridge holding portion 81 in the retraction direction is desirably located on the outside of the apparatus.

As described above, the toner cartridge 70*k* and the tray 80*k* are larger in size than the other toner cartridges 70*y* to 70*c* and trays 80*y* to 80*c*. As illustrated in FIGS. 7A and 7B, in the present embodiment, the moving amounts of the trays 80 are thus changed depending on the sizes of the toner cartridges 70.

Specifically, as illustrated in FIG. 7A, the moving distance when the tray 80*k* (first support member) moves from the accommodation position (first accommodation position) to the detachment position (first detachment position) is L1. The moving distance when the tray 80*m* (second support member) moves from the accommodation position (second accommodation position) to the detachment position (second detachment position) is L2. FIG. 7B illustrates a state where the toner cartridge 70*m* and the tray 80*m* are moved. The moving distances when the trays 80*y* and 80*c* are moved from the accommodation position to the detachment position are also L2. Here, L1 is greater than L2. In other words, the moving distance of the first support member when the first toner cartridge moves from the first attached position to the first retracted position can be said to be greater than the moving distance of the second support member when the second toner cartridge moves from the second attached position to the second retracted position.

As illustrated in FIG. 7A, with the tray 80*k* at the detachment position and the toner cartridge 70*k* at the retracted position, the toner cartridge 70*k* protrudes from the exterior surface of the apparatus main body 1A to the outside of the apparatus by a distance P1. In the present embodiment, the tray 80*k* also protrudes from the exterior surface of the apparatus main body 1A to the outside of the apparatus by the distance P1.

As illustrated in FIG. 7B, with the tray 80*m* at the detachment position and the toner cartridge 70*m* at the retracted position, the toner cartridge 70*m* protrudes from the exterior surface of the apparatus main body 1A to the outside of the apparatus by a distance P2. In the present embodiment, the tray 80*m* also protrudes from the exterior surface of the apparatus main body 1A to the outside of the apparatus by the distance P2. The toner cartridges 70*y* and 70*c* also protrude from the exterior surface of the apparatus main body 1A to the outside of the apparatus by the distance P2.

The distance P1 is greater than the distance P2. To put it in another way, suppose that the protruding length of the first toner cartridge at the first retracted position from the opening 16*a* of the apparatus main body 1A is a first length (P1), and the protruding length of the second toner cartridge at the second retracted position from the opening 16*a* is a second length (P2). In such a case, the first length can be said to be greater than the second length.

In terms of strength, the distance P2 by which the toner cartridges 70*y* to 70*c* smaller in size than the toner cartridge 70*k* protrude to the outside of the apparatus at the retracted position is desirably smaller than the distance P1 by which the toner cartridge 70*k* protrudes to the outside of the apparatus at the retracted position. The reason is as follows. When the toner cartridge 70 is located at the retracted position, at least a part of the toner cartridge 70 protrudes outside the rotation path of the rotary main body 90, or from the exterior surface of the apparatus main body 1A to the outside of the apparatus. Here, the tray 80 supports the weight of the toner cartridge 70 in a state of being cantilevered on the rotary main body 90. The load on the trays 80*y* to 80*c* and guide units (not illustrated) of the rotary main body 90 for supporting the trays 80*y* to 80*c* can thus be reduced by reducing the distance P2 as much as which the toner cartridges 70*y* to 70*c* protrude to the outside of the apparatus at the retracted position. Moreover, the toner cartridges 70*y* to 70*c* are smaller in size than the toner cartridge 70*k*, and the workability of the cartridge replacement on the trays 80*y* to 80*c* can be maintained even if the distance P2 is made smaller than the distance P1.

(Tray Layout in Rotary)

Figure 8:
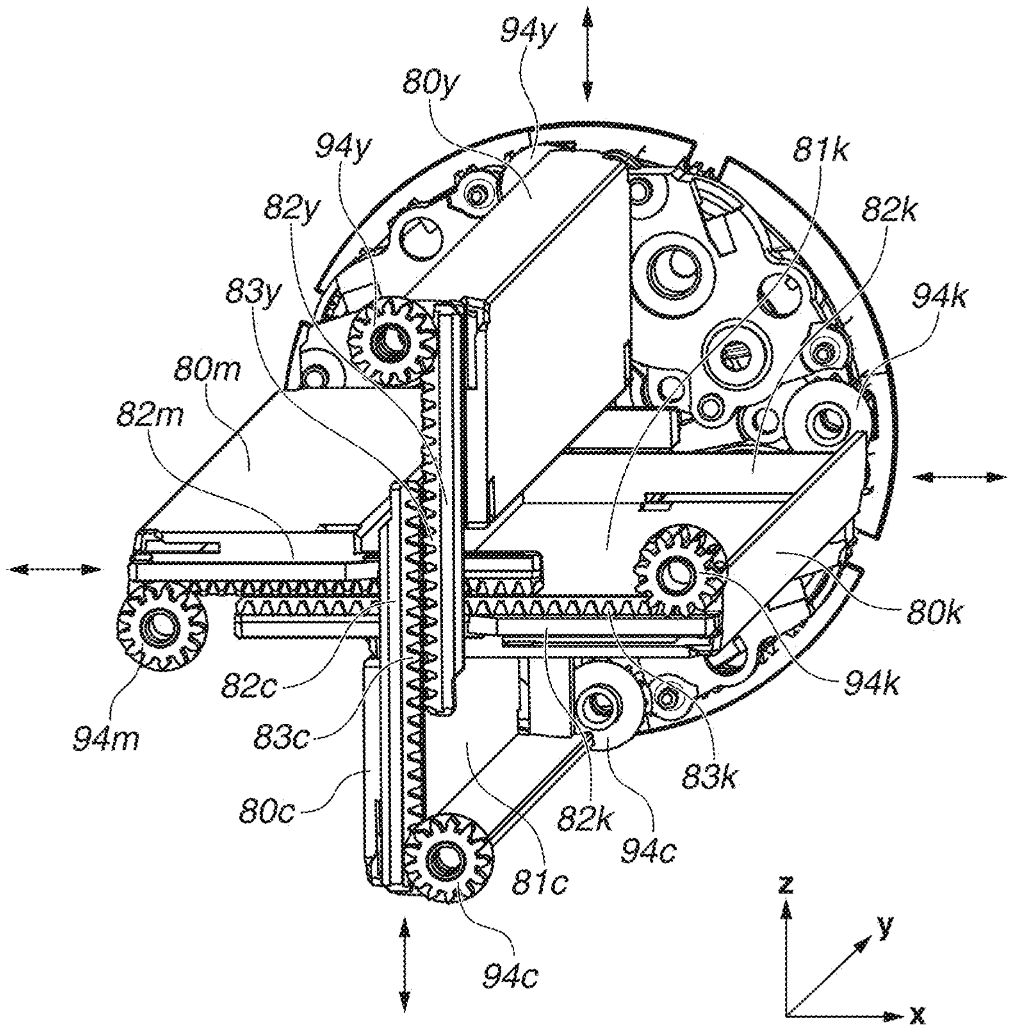
FIG. 8 is an explanatory diagram illustrating the rotary main body according to the first embodiment.
Figure 9:
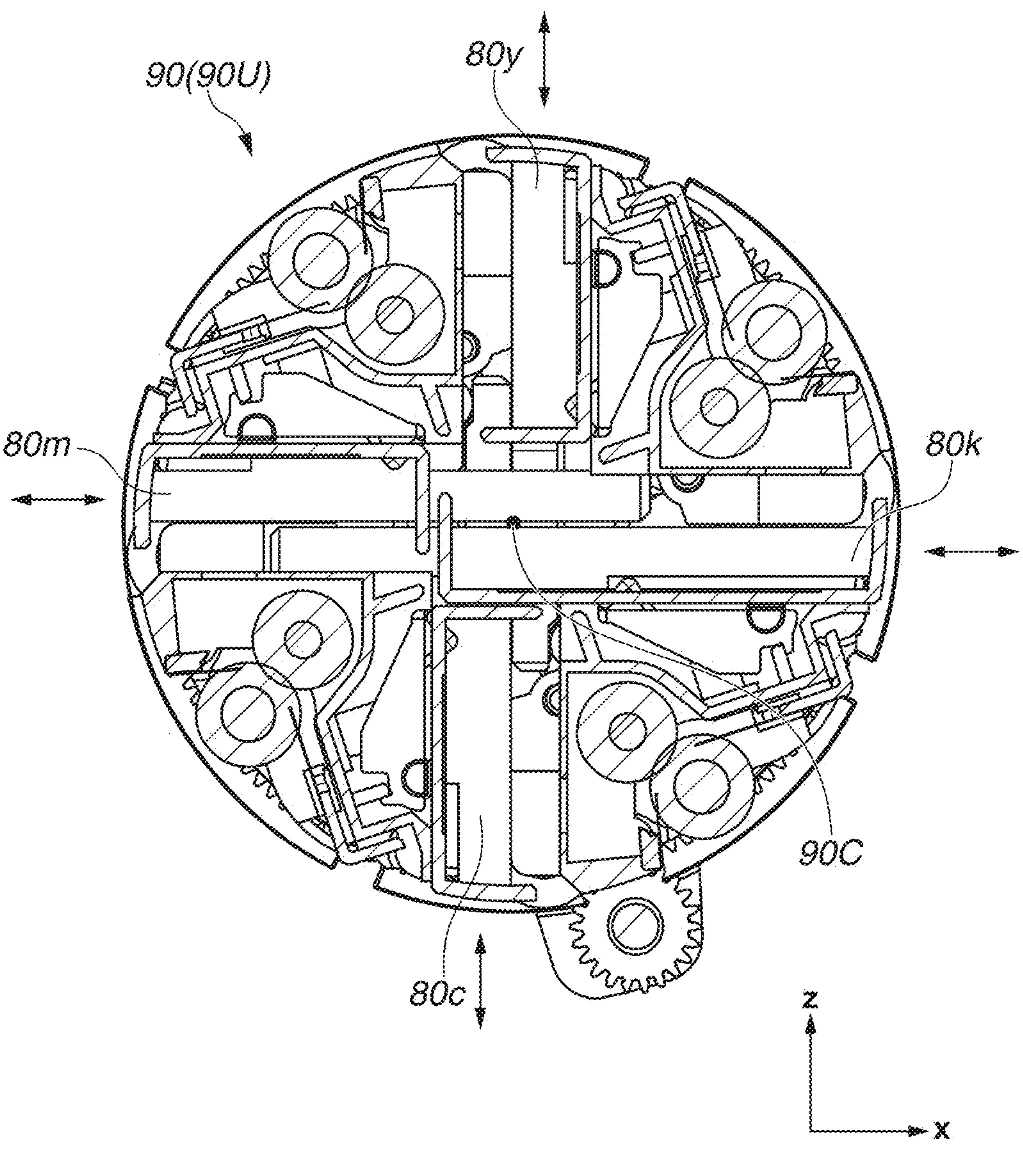
FIG. 9 is an explanatory diagram illustrating the rotary main body according to the first embodiment.
Figure 10:
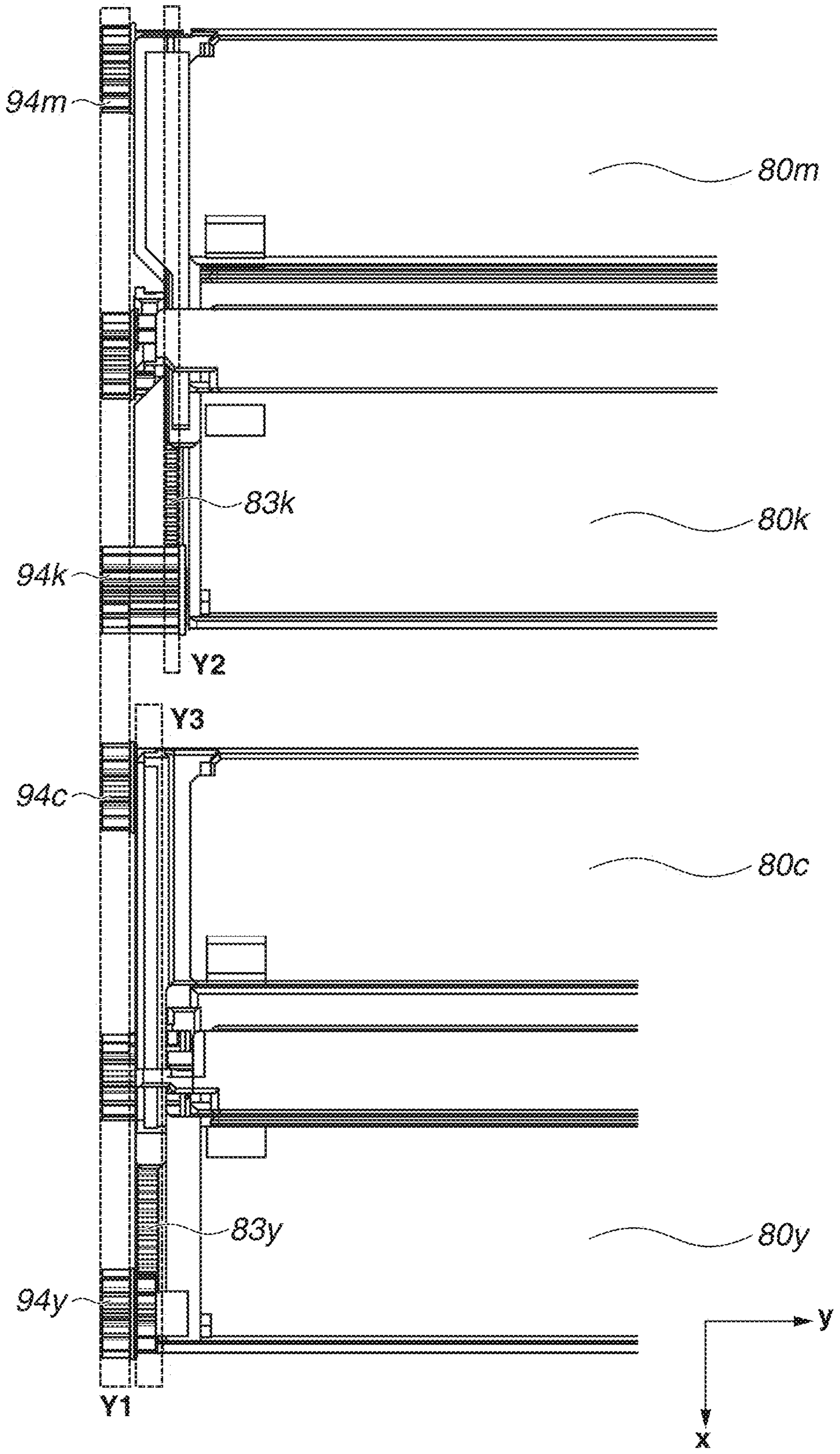
FIG. 10 is an explanatory diagram illustrating the rotary main body according to the first embodiment.

The layout of the trays 80*y* to 80*k* in the rotary main body 90 will be describe with reference to FIGS. 8, 9, and 10. FIG. 8 is a perspective view illustrating the layout of the trays 80*y* to 80*k* in the rotary main body 90. FIG. 9 is a sectional view illustrating the layout of the trays 80*y* to 80*k* in the rotary main body 90. FIG. 10 is a diagram illustrating the arrangement of members at one end side of the trays 80*y* to 80*k* in the Y direction. FIG. 9 illustrates a cross section of the rotary main body 90 in an imaginary plane perpendicular to the rotation axis 90C of the rotary main body 90. The upper half of FIG. 10 is a view of the rotary main body 90 and the trays 80*m* and 80*k* seen from the upper right of FIG. 8 (+Z side). The lower half of FIG. 10 is a view of the rotary main body 90 and the trays 80*c* and 80*y* seen from the left of FIG. 8 (−X side).

As illustrated in FIG. 8, the trays 80*y* to 80*k* include the cartridge holding portions 81*y* to 81*k* and to-be-guided portions 82*y* to 82*k*, respectively.

The toner cartridges 70*y* to 70*k* are attached to the cartridge holding portions 81*y* to 81*k*, respectively. The cartridge holding portions 81$y$ to 81$k$ accommodate at least a part of the respective toner cartridges 70$y$ to 70$k$ attached thereto.

The to-be-guided portions 82$y$ to 82$k$ are located on both ends of the trays 80$y$ to 80$k$ in the Y direction with the cartridge holding portions 81$y$ to 81$k$ therebetween. Each of the to-be-guided portions 82$y$ to 82$k$ is a slender member extending in a direction orthogonal to the rotation axis of the rotary main body 90.

Figure 11A:
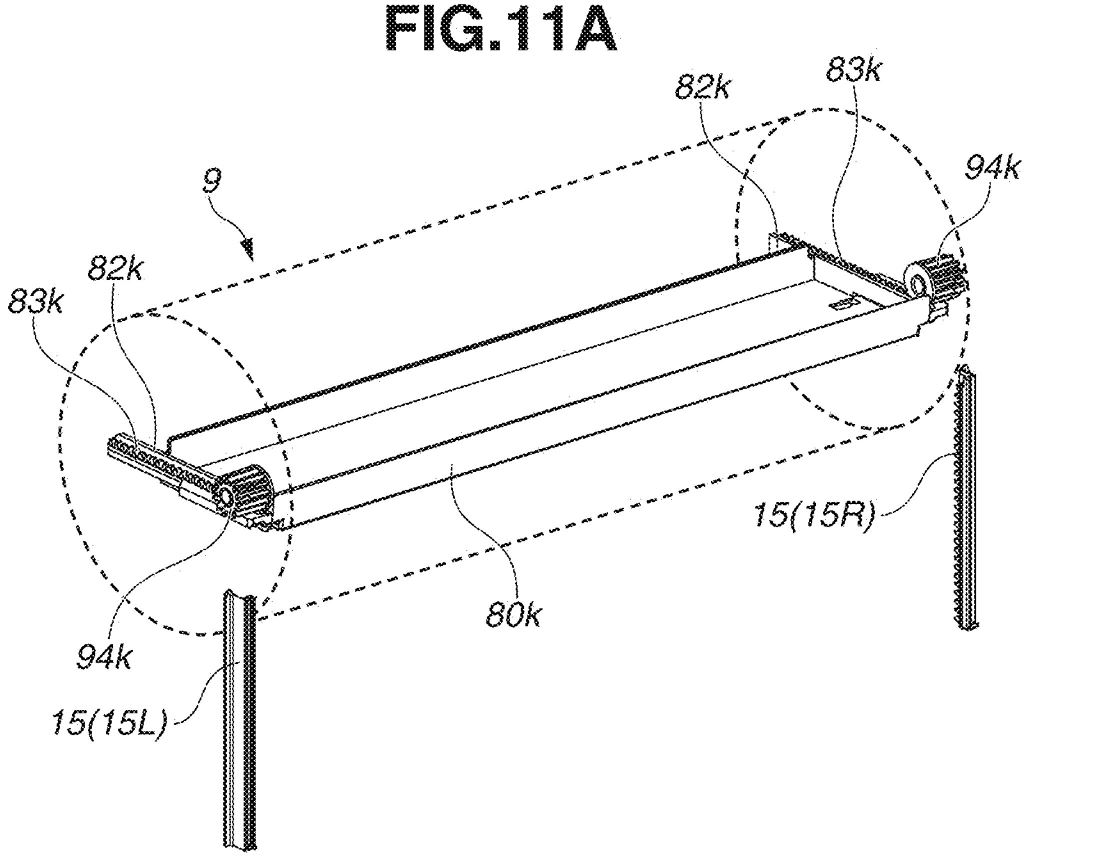
FIGS. 11A and 11B are explanatory diagrams illustrating a configuration related to movement of a tray according to the first embodiment.
Figure 11B:
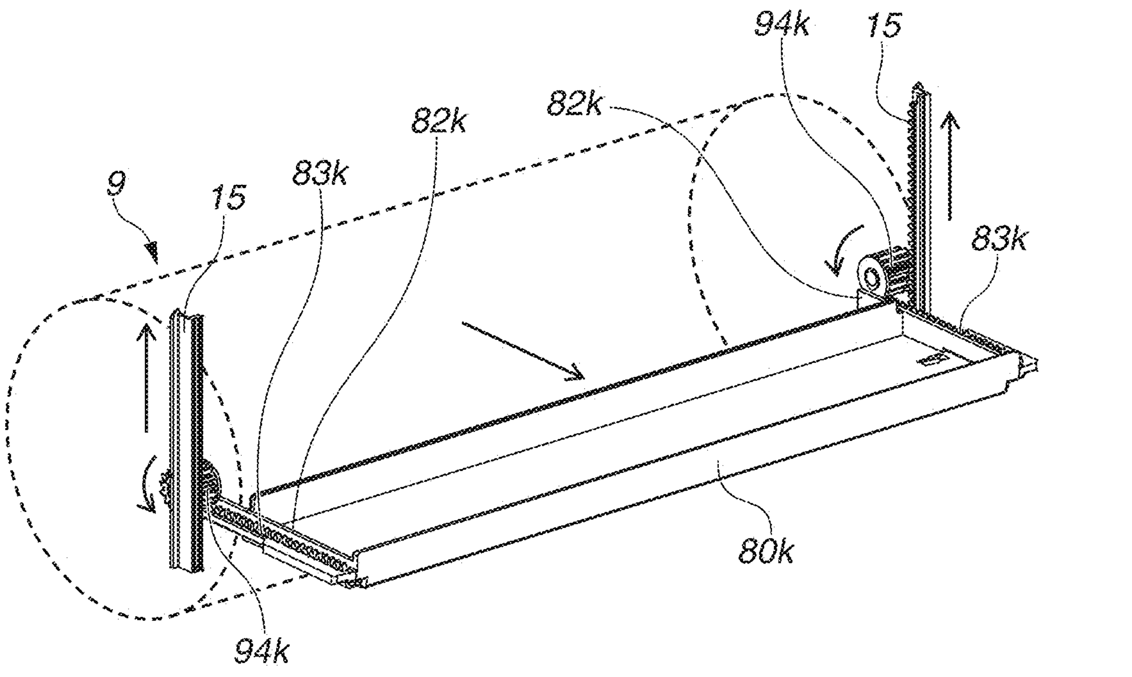

In the present embodiment, reinforcement ribs (not illustrated) are formed on a part of each to-be-guided portion 82$k$ in a moving direction of the tray 80$k$, and reinforcement ribs (not illustrated) are formed on a part of each to-be-guided portion 82$m$ in a moving direction of the tray 80$m$ (see also FIGS. 11A and 11B). The reinforcement ribs are rib shapes (ridges) that protrude outward in the Y direction from the to-be-guided portions 82$k$ and 82$m$ located on both ends of the trays 80$k$ and 80$m$ in the Y direction and extend long in the moving directions of the trays 80$k$ and 80$m$. The reinforcement ribs improve the rigidity of the to-be-guided portions 82$k$ and 82$m$.

In the present embodiment, the reinforcement rigs have limited lengths to avoid the to-be-guided portions 82$y$ and 82$c$. However, in cases where there is no possibility of interference with the to-be-guided portions 82$y$ and 82$c$, the reinforcement ribs may be disposed over the entire lengths of to-be-guided portions 82$m$ and 82$k$. Reinforcement ribs may also be added to the to-be-guided portions 82$y$ and 82$c$. If the to-be-guided portions 82$m$ and 82$k$ have sufficient rigidity, the reinforcement ribs may be omitted.

Rack portions 83$y$ to 83$k$ (rack gears) are formed on the to-be-guided portions 82$y$ to 82$k$. Pinion gears 94$y$ to 94$k$ are rotatably held inside the rotary main body 90. The pinion gears 94$y$ to 94$k$ mesh with the rack portions 83$y$ to 83$k$, respectively, in a manner capable of drive transmission.

The rack portions 83$y$ to 83$k$ and the pinion gears 94$y$ to 94$k$ are parts of the moving devices that are configured to move the toner cartridges 70$y$ to 70$k$ from the attached positions to the retracted positions. The rack portions 83$y$ to 83$k$ and the pinion gears 94$y$ to 94$k$ can be said to be parts of to-be-driven devices to be driven by the driving device of the apparatus main body 1A.

The pinion gears 94$y$ to 94$k$ can be said to be rotating bodies (rotating members) that rotate to move the trays 80$y$ to 80$k$ relative to the rotary main body 90.

The pinion gears 94$y$ to 94$k$ and the rack portions 83$y$ to 83$k$ function as to-be-driven portions for the moving devices of the rotary main body 90 to receive driving force from the driving device of the apparatus main body 1A. The pinion gears 94$k$ and the rack portions 83$k$ are examples of a first pinion gear and a first rack gear constituting at least a part of a first to-be-driven unit included in the first driving device. The pinion gears 94$m$ and the rack portions 83$m$ are examples of a second pinion gear and a second rack gear constituting at least a part of a second to-be-driven unit included in the second moving device.

The rotary main body 90 includes guide portions to be engaged with the to-be-guided portions 82$y$ to 82$k$. The rotary main body 90 includes similar guide portions to be engaged with the to-be-guided portions 82$y$ and 82$c$ of the trays 80$y$ and 80$c$. The guide portions are located not only on one side (+Y side) of the rotary main body 90 in the Y direction, but also on the other side (−Y side) of the rotary main body 90 in the Y direction.

When the tray 80 moves between the accommodation position and the detachment position, the guide portions maintain engagement with the to-be-guided portions 82 and guide the moving direction of the tray 80 in at least a part of the moving range. In the present embodiment, the guide portions maintain engagement with the to-be-guided portions 82$k$ across the entire moving range between the accommodation position and the detachment position of the tray 80$k$. In the present embodiment, the guide portions maintain engagement with the to-be-guided portions 82$m$ across the entire moving range between the accommodation position and the detachment position of the tray 80$m$.

As illustrated in FIGS. 8 and 9, the four trays 80$y$ to 80$k$ are arranged to overlap each other in the rotary main body 90 as will be specifically described below.

As the pinion gears 94$y$ to 94$k$ rotate, the rack portions 83$y$ to 83$k$ and the trays 80$y$ to 80$k$ move relative to the rotary main body 90. As illustrated in FIG. 9, the four trays 80$y$ to 80$k$ are arranged with their moving directions rotated in units of 90° with respect to the rotary main body 90. The trays 80$y$ and 80$c$, and the trays 80$m$ and 80$k$, are thus held to be slidable in substantially the same directions (parallel directions). Such moving directions of the trays 80$y$ to 80$k$ during slide movement are regulated by the engagement of the foregoing to-be-guided portions 82$y$ to 82$y$ and the guide portions.

The trays 80$y$ to 80$k$ move to the outside of the apparatus through the opening 16$a$. The moving direction of each of the trays 80$y$ to 80$k$ when moving from the opening 16$a$ to the outside of the apparatus is substantially the same (parallel).

As illustrated in FIG. 9, in the moving direction of the tray 80$k$, the range where the tray 80$k$ is located is arranged to overlap the range where the tray 80$y$ is located and the range where the tray 80$c$ is located. In the moving direction of the tray 80$k$, the range where the tray 80$k$ is located also overlaps the rotation axis 90C of the rotary main body 90. In other words, the toner cartridge 70$k$ held by the cartridge holding portion 81$k$ of the tray 80$k$ can be said to overlap the rotation axis 90C of the rotary main body 90 (FIG. 4B).

In the moving direction of the tray 80$m$, the range where the tray 80$m$ is located is offset to not overlap the range where the tray 80$y$ is located or the range where the tray 80$c$ is located. In the moving direction of the tray 80$y$, the range where the tray 80$y$ is located is offset to not overlap the range where the tray 80$m$ is located or the range where the tray 80$k$ is located. Similarly, in the moving direction of the tray 80$c$, the range where the tray 80$c$ is located is offset to not overlap the range where the tray 80$m$ is located or the range where the tray 80$k$ is located.

The positional relationship between the trays 80 can also be expressed as follows: When viewed in the moving direction of the tray 80$y$, the tray 80$y$ and the tray 80$k$ overlap, and the tray 80$y$ and the tray 80$m$ do not overlap. When viewed in the moving direction of the tray 80$m$, the tray 80$m$ and the tray 80$k$ overlap, and the tray 80$m$ and the trays 80$y$ and 80$c$ do not overlap. When viewed in the moving direction of the tray 80$c$, the tray 80$c$ and the tray 80$k$ overlap, and the tray 80$c$ and the tray 80$m$ do not overlap.

As employed herein, that two elements (members, parts, units, etc.) overlap when viewed in a specific direction refers to that when the elements are perpendicularly projected upon an imaginary plane perpendicular to the direction, the projected area of one of the elements and the projected area of the other overlap at least in part.

As illustrated in FIGS. 8 and 10, in the direction of the rotation axis 90C (Y direction), the range where the rack portions 83$m$ and the to-be-guided portions 82$m$ are located and the range where the rack portions 83$k$ and the to-be-guided portions 82k are located overlap at least in part. In other words, in the present embodiment, the range where the first rack gears (rack portions 83k) are located and the range where the second rack gears (rack portions 83m) are located can be said to overlap at least in part in the rotation axis direction of the rotary (Y direction). Compared to an arrangement where the rack portions 83m and the to-be-guided portions 82m do not overlap the rack portions 83k or the to-be-guided portions 82k, the rack portions 83m and 83k and the to-be-guided portions 82m and 82k can thus be arranged in a space-saving manner in the Y direction.

In the direction of the rotation axis 90C (Y direction), the range where the rack portions 83y and the to-be-guided portions 82y are located and the range where the rack portions 83c and the to-be-guided portions 82c overlap at least in part. In other words, in the present embodiment, the range where the third rack gears (third rack portions 83y) are located and the range where the fourth rack gears (rack portions 83c) are located overlap at least in part in the rotation axis direction of the rotary (Y direction). Compared to an arrangement where the rack portions 83y and the to-be-guided portions 82y do not overlap the rack portions 83c or the to-be-guided portions 82c, the rack portions 83y and 83c and the to-be-guided portions 82y and 82c can be arranged in a space-saving manner in the Y direction.

Now, the meshing positions of the rack portions 83 and the pinion gears 94 will be described with reference to FIG. 10. The upper half of FIG. 10 illustrates the meshing position of a rack portion 83k and a pinion gear 94k. The lower half of FIG. 10 illustrates the meshing position of a rack portion 83y and a pinion gear 94y.

The driving force transmitted from the motor M2 serving as the driving source (FIG. 2) via the transmission device to be describing below is transmitted to the pinion gears 94y to 94k in an area Y1 in the diagram in the direction of rotation axis 90C of the rotary main body 90 (Y direction). The pinion gear 94k meshes with the rack portion 83k in a manner capable of drive transmission in an area Y2 in the diagram in the Y direction. The pinion gear 94y meshes with the rack portion 83y in a manner capable of drive transmission in an area Y3 in the diagram in the Y direction. Like the rack portion 83k, the rack portion 83m meshes with the pinion gear 94m (FIG. 8) in a manner capable of drive transmission in the area Y2. Like the rack portion 83y, the rack portion 83c meshes with the pinion gear 94c (FIG. 8) in a manner capable of drive transmission in the area Y3.

Here, the areas Y2 and Y3 are located at different positions in the Y direction (offset in the Y direction). The area Y1 is located at a position different from both the areas Y2 and Y3 in the Y direction. In other words, the area Y1 is offset from the areas Y2 and Y3 in the Y direction.

With the toner cartridges 70y and 70c at the attached positions, the range where the rack portions 83y are located and the range where the rack portions 83c are located overlap at least in part in the moving direction of the rack portions 83y (the moving direction of the tray 80y). In the present embodiment, the moving directions of the trays 80y and 80c are substantially the same (parallel), the range where the rack portions 83y are located and the range where the rack portions 83c are located therefore also overlap at least in part in the moving direction of the tray 80c. With the toner cartridges 70y and 70c at the attached positions, the tooth faces of the rack portions 83y and the tooth faces of the rack portions 83c are therefore opposed to each other in a direction orthogonal to the moving directions of the rack portions 83y and 83c (horizontal direction in FIG. 8).

With the toner cartridges 70m and 70k at the attached positions, the range where the rack portions 83m are located and the range where the rack portions 83k are located overlap at least in part in the moving direction of the rack portions 83m (moving direction of the tray 80m). In the present embodiment, the moving directions of the trays 80m and 80k are substantially the same (parallel), and the range where the rack portions 83m are located and the range where the rack portions 83k are located therefore also overlap at least in part in the moving direction of the tray 80k. With the toner cartridges 70m and 70k at the attached positions, the tooth faces of the rack portions 83m and the tooth faces of the rack portions 83k are therefore opposed to each other in a direction orthogonal to the moving directions of the rack portions 83m and 83k (vertical direction in FIG. 8).

Figure 12A:
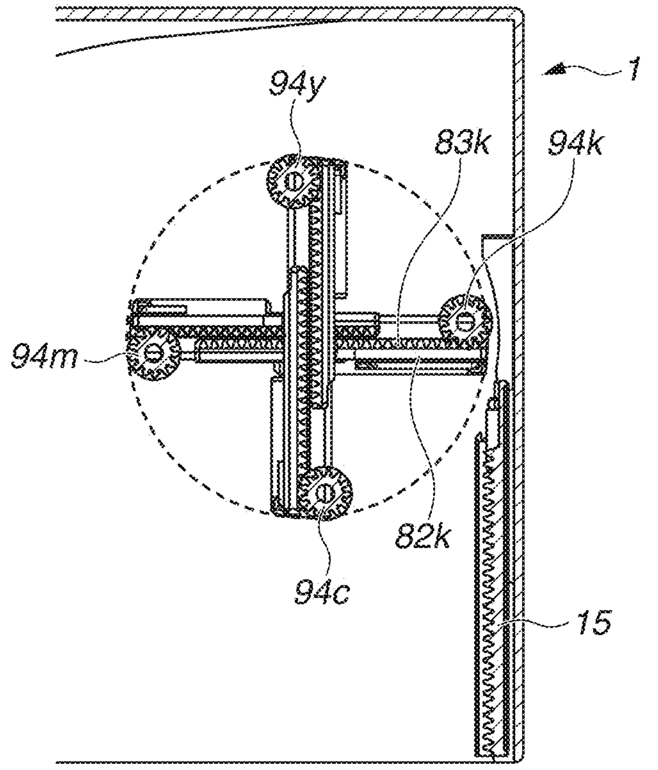
FIGS. 12A and 12B are explanatory diagrams illustrating a configuration related to movement of a tray according to the first embodiment.

As also illustrated in FIG. 12A to be described below, the rack portions 83y overlap the rack portions 83m and 83k when viewed in the direction of the rotation axis 90C (Y direction). The rack portions 83m overlap the rack portions 83y and 83c when viewed in the direction of the rotation axis 90C (Y direction). The rack portions 83c overlap the rack portions 83m and 83k when viewed in the direction of the rotation axis 90C (Y direction). The rack portions 83k overlap the rack portions 83y and 83c when viewed in the direction of the rotation axes 90C (Y direction). In other words, the range where the first rack gears (rack portions 83k) are located and the range where the second rack gears (rack portions 83m) are located can be said to not overlap in the rotation axis direction of the rotary (Y direction). With the first toner cartridge 70k at the first attached position and the second toner cartridge 70y at the second attached position, the first rack gears (rack portions 83k) and the second rack gears (rack portions 83y) can be said to overlap when viewed in the rotation axis direction of the rotary (Y direction).

Since the positions where the rack portions 83k and 83m are located and the positions where the rack portions 83y and 83c are located are thus different in the Y direction, the rack portions 83y and 83c can be arranged to overlap the rack portions 83m and 83k when viewed in the Y direction.

This can save space for arranging the four trays in the rotary main body 90 and miniaturize the rotary main body 90 in the radial direction of rotation. If the rack portions 83 are arranged to not overlap each other when viewed in the Y direction with the moving distances of the respective trays 80y to 80k maintained equivalent to those in the present embodiment, the area needed to arrange the four pairs of rack portions increases when viewed in the Y direction. Compared to such a configuration, arranging the plurality of pairs of rack portions 83 at positions offset in the Y direction so that the rack portions 83 overlap when viewed in the Y direction can reduce the area for arranging the rack portions 83 when viewed in the Y direction.

In the present embodiment, the positions of the four pairs of rack portions 83y to 83k in the Y direction are offset in two sets of two pairs. In other words, the range where the first rack gears are located and the range where the second rack gears are located can be said to overlap, and the range where the third rack gears are located and the range where the fourth rack gears are located can be said to overlap, in the rotation axis direction of the rotary (Y direction). Moreover, the ranges where the first rack gears and the second rack gears are located can be said to be arranged to not overlap the ranges where the third rack gears and the fourth rack gears are located in the Y direction. This allows to miniaturize the rotary main body 90 in the Y direction as compared to the case where the four pairs of rack portions 83$y$ to 83$k$ are located at respective different positions in the Y direction.

(Tray Moving Configuration)

Figure 12B:
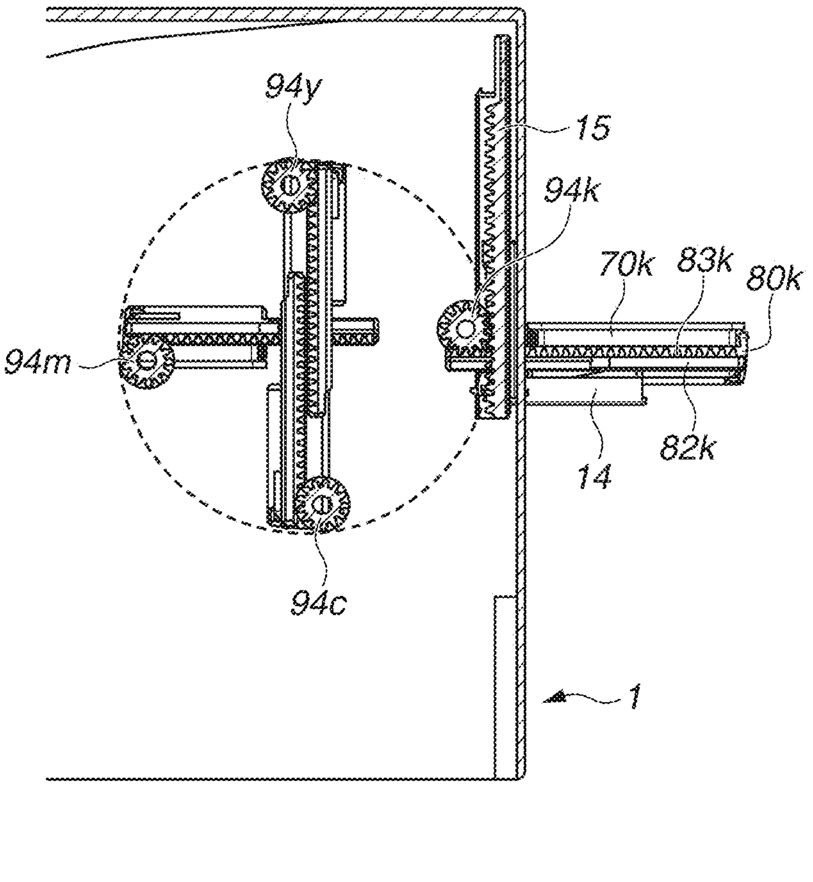

A configuration related to the movement of the trays 80$y$ to 80$k$ arranged in the rotary main body 90 will be described with reference to FIGS. 11A, 11B, 12A, and 12B. FIGS. 11A and 11B are perspective views illustrating a configuration related to the movement of the tray 80$k$. FIGS. 12A and 12B are sectional views illustrating the configuration related to the movement of the tray 80$k$.

In the present embodiment, all the trays 80$y$ to 80$k$ are driven by the driving force of the motor M2 being transmitted to the pinion gears 94$y$ to 94$k$ via the drive racks 15L and 15R as a transmission device. Here, a configuration for moving the tray 80$k$ relative to the rotary main body 90 will be described. Configurations for driving the trays 80$y$ to 80$c$ relative to the rotary main body 90 are substantially the same as that for driving the tray 80$k$, and a description thereof will thus be omitted.

FIG. 11A illustrates a state where the tray 80$k$ is located inside the rotary main body 90 (i.e., where the toner cartridge 70$k$ is attached to the developing unit 50$k$). In other words, FIG. 11A illustrates a state where the tray 80$k$ is at the accommodation position, which corresponds to a state where the toner cartridge 70$k$ is at the detachment position with respect to the developing frame 53$k$ (FIG. 4A). FIG. 11B illustrates a state where the tray 80$k$ is slid out of the rotary main body 90. In other words, FIG. 11B illustrates a state where the tray 80$k$ is located at the attached position, which corresponds to a state where the toner cartridge 70$k$ is located at the retracted position with respect to the developing frame 53$k$ (FIG. 4B).

The apparatus main body 1A according to the present embodiment includes the drive racks 15L and 15R serving as drive gears for driving the pinion gears 94. Each drive rack 15 is driven by the motor M2 via a not-illustrated drive transmission mechanism.

As described above, the two rack portions 83$k$ are formed on both ends of the tray 80$k$ in the Y direction. The two pinion gears 94$k$ and the two drive racks 15L and 15R are disposed at positions corresponding to the rack portions 83$k$ on both ends. In other words, the apparatus main body 1A according to the present embodiment includes the drive racks 15L and 15R as a first drive gear and a second drive gear. The drive rack 15L can be said to be an example of the first drive gear, and the drive rack 15R an example of the second drive gear.

Note that such numbering is used for the convenience of description only, and in principle can be interchanged as appropriate. When distinction is not needed, the drive racks 15L and 15R will be referred to as “drive racks 15”.

The rack portions 83 according to the present embodiment are configured as a rack gear pair, and the pinion gears 94 according to the present embodiment as a pinion gear pair. In the present embodiment, the rack gear pair and the pinion gear pair are located on one end side and the other end side of the support member (tray 80) in the Y direction, but may be located at other positions. The rack portions 83$k$ and the pinion gears 94$k$ of the moving device corresponding to the tray 80$k$ can be said to be an example of a first rack gear pair and a first pinion gear pair, respectively.

The rack portions 83$y$ to 83$c$ and the pinion gears 94$y$ to 94$c$ of the moving devices corresponding to the respective other trays 80$y$ to 80$c$ can be said to be examples of a second rack gear pair and a second pinion gear pair, respectively.

One of a rack gear pair meshes with one of a pinion gear pair, and the other of the rack gear pair meshes with the other of the pinion gear pair. At least one of the pinion gear pair is driven by the drive rack 15L serving as the first drive rack. In the present embodiment, the pinion gear pair is both driven by the drive racks 15L and 15R serving as the first drive rack and the second drive rack at the same time. This suppresses rotation of the tray 80 and enables stable movement of the toner cartridge 70.

The tray 80 may be configured to have one rack portion 83 and be moved by one drive rack 15 via one pinion gear 94.

The tray 80$k$ is held to be slidable relative to the rotary main body 90 in a direction parallel to the to-be-guided portions 82$k$ (i.e., moving direction). The drive racks 15 are held to be slidable relative to the apparatus main body 1A in a direction intersecting the moving direction of the tray 80$k$. The drive racks 15 are configured to slide (reciprocate) relative to the apparatus main body 1A in a first direction (in the present embodiment, vertically upward) and a second direction opposite to the first direction (in the present embodiment, vertical downward). In other words, the moving directions of the drive racks 15 according to the present embodiment are directions intersecting (desirably orthogonal to) both the moving direction of the tray 80$k$ and the direction of the rotation axis 90C of the rotary main body 90 (Y direction).

Tray moving operations for sliding the tray 80$k$ between the accommodation position and the detachment position will be described with reference to FIGS. 11A and 11B. The tray moving operations of the tray 80$k$ are performed by the motor M2 (FIG. 2), the not-illustrated drive transmission mechanism, the drive racks 15, the pinion gears 94$k$, and the rack portions 83$k$.

A tray moving operation (tray pull-out operation) in detaching the toner cartridge 70$k$ from the rotary main body 90 will initially be described. In a state before the tray pull-out operation is started, the drive racks 15 are located below the meshing positions with the pinion gears 94$k$ (FIG. 11A). As described above, during the replacement operation of the toner cartridge 70$k$, the rotary main body 90 assumes the replacement orientation for the toner cartridge 70$k$ (FIG. 4B).

When the tray pull-out operation is started, the drive racks 15 are slid upward relative to the apparatus main body 1A by the driving force of the motor M2. In the moving process, the drive racks 15 come into mesh with the pinion gears 94$k$, and the pinion gears 94$k$ are driven to rotate.

As illustrated in FIG. 11B, the pinion gears 94$k$ are driven to rotate in the directions of the arrows in the diagram, whereby the driving force is input to the rack portions 83$k$ in mesh with the pinion gears 94$k$. The tray 80$k$ is thereby pushed out to the outside of the apparatus, moving from the accommodation position to the detachment position relative to the rotary main body 90. The moving direction of the tray 80$k$ here is guided to the predetermined moving direction through engagement of the to-be-guided portions 82$k$ and the guide portions of the rotary main body 90. As a result of the movement of the tray 80$k$ from the accommodation position to the detachment position, the toner cartridge 70$k$ is moved from the attached position to the retracted position relative to the developing unit 50$k$.

With the tray 80$k$ located at the detachment position and the toner cartridge 70$k$ located at the retracted position, the user can detach and attach the toner cartridge 70$k$ from/to the tray 80$k$.

A tray moving operation (tray pull-in operation, tray insertion operation) in attaching the toner cartridge 70 to the rotary main body 90 is performed in processes reverse to those of the tray-pull-out operation. For example, the user operates a predetermined operation unit to start the tray pull-in operation. When the tray pull-in operation is started, the drive racks 15 are slid downward relative to the apparatus main body 1A by the driving force of the motor M2. The rotating direction of the motor M2 in the tray pull-in operation is opposite to in the tray pull-out operation.

The pinion gears 94K are driven to rotate in the direction opposite to the arrows in FIG. 11B, whereby the driving force is input to the rack portions 83*k* in mesh with the pinion gears 94*k*. The tray 80*k* is thereby pulled into the apparatus, moving from the detachment position to the accommodation position relative to the rotary main body 90.

The moving direction of the tray 80*k* is guided to the moving direction (opposite to the arrow in FIG. 11B) through the engagement of the to-be-guided portions 82*k* and the guide portions of the rotary main body 90. As a result of the movement of the tray 80*k* from the detachment position to the accommodation position, the toner cartridge 70*k* is moved from the retracted position to the attached position relative to the developing unit 50*k*.

While the movement of the black tray 80*k* and toner cartridge 70*k* has been described above, the other trays 80*y* to 80*c* and toner cartridges 70*y* to 70*c* are also moved by similar mechanisms. That is, in the replacement orientations of the respective toner cartridges, the drive racks 15 transmit drive to the pinion gears 94*y* to 94*c*.

The driving device for driving the moving devices disposed in the rotary main body 90 is constituted by the motor M2 included in the apparatus main body 1A and the transmission device including the drive racks 15 (15L and 15R) and the drive transmission mechanism.

As described above, in the present embodiment, the rotary main body 90 includes the plurality of moving devices corresponding to the plurality of toner cartridges 70*k* to 70*y*. The driving device of the apparatus main body 1A is a common driving device that drives the plurality of moving devices (plurality of to-be-driven devices) of the rotary main body 90.

In the present embodiment, the driving device switches its driving target depending on the rotation of the rotary main body 90. The driving device according to the present embodiment includes the drive racks 15 serving as transmission members for transmitting the driving force of the driving source. The driving device can assume a state where the transmission members are engaged with first to-be-driven portions (pinion gears 94*k*) in a manner capable of drive transmission and a state where the transmission members are engaged with second to-be-driven portions (pinion gears 94*m*) in a manner capable of drive transmission. The driving device can also assume a state where the transmission members are disengaged from the first to-be-driven portions and the second to-be-driven portions.

As described above, the pinion gears 94*y* to 94*k* are held by the rotary main body 90. When the rotary main body 90 rotates, the pinion gears 94*y* to 94*k* and the drive racks 15 are therefore desirably disengaged from each other.

FIG. 12A illustrates a state where the tray 80*k* is located inside the rotary main body 90 (at the accommodation position). FIG. 12B illustrates a state where the tray 80*k* is moved to outside the rotary main body 90 (moved to the detachment position).

As illustrated in FIG. 12A, when the tray 80*k* is inside the rotary main body 90, the drive racks 15 are located in the lower part of the apparatus main body 1A. Here, the drive racks 15 are retracted from the pinion gears 94. The rotary main body 90 can thus be rotated without interference with the drive racks 15. More specifically, the drive racks 15 can be retracted to outside the rotation path of the rotary main body 90, illustrated in a dotted line in FIGS. 12A and 12B.

As described above, the tray 80 attached to the rotary main body 90 can be moved from the accommodation position to the detachment position and from the detachment position to the accommodation position relative to the rotary main body 90 by driving the motor M2 to rotate forward and backward. In other words, the driving device according to the present embodiment can not only drive each moving device of the rotary so that the toner cartridge 70 moves from the attached position to the retracted position but also drive each moving device so that the toner cartridge 70 moves from the retracted position to the attached position.

As described above, in the present embodiment, the moving amounts of the trays 80 during toner cartridge replacement are changed depending on the sizes of the toner cartridges 70. Specifically, as illustrated in FIGS. 7A and 7B, the moving distance L1 when the black tray 80*k* moves from the accommodation position to the detachment position is greater than the moving distance L2 when the other trays 80*y* to 80*c* move from their accommodation position to their detachment position.

In the present embodiment, in moving the toner cartridges 70*y* to 70*k* from their attached position to their retracted position, the quantity obtained by dividing the speed of the rack portion 83*k* by the speed of the drive racks 15 is greater than the quantity obtained by dividing the speed of the rack portions 83*y* to 83*c* by the speed of the drive racks 15.

For example, as illustrated in FIG. 10, the pinion gear 94*y* is configured as a stepped gear so that the pitch circle radius of a small diameter gear 942 in mesh with the rack portion 83*y* is smaller than that of a large diameter gear 941 in mesh with the drive rack 15. The pinion gears 94*m* and 94*c* are configured as similar stepped gears. On the other hand, the pinion gear 94*k* is configured to have the same pitch circle radius at the meshing portion with the drive rack 15 and the meshing portion with the rack portion 83*k*. Here, the pitch circle radius of the pinion gear 94*k* can be the same as that of the large diameter gears 941 of the pinion gears 94*y* to 94*c*. With such a configuration, the moving distance of the rack portion 83*k* can be made greater than that of the other rack portions 83*y* to 83*c* for the same moving distance of the drive rack 15. More specifically, the moving distance L1 when the black tray 80*k* moves from the accommodation position to the detachment position can be made greater than the moving distance L2 when the other trays 80*y* to 80*c* move their accommodation position to their detachment position.

Since the pinion gears 94*y* to 94*c* are configured as stepped gears, the moving direction L1 of the tray 80*k* can be made greater than the moving distance L2 of the other trays 80*y* to 80*c* despite the configuration that the pinion gears 94*y* to 94*k* receive driving force from the same drive rack 15.

Instead of (or in combination with) configuring the pinion gears 94*y* to 94*c* as stepped gears, the pinion gear 94*k* may be configured as a stepped gear. In such a case, the portion where the pinion gear 94*k* meshes with the rack portion 83*k* can be configured as a small diameter gear, and the portion where the pinion gear 94*k* meshes with the rack portion 83*k* as a large diameter gear having a pitch circle radius greater than that of the small diameter gear. The stepped gears are an example of a reduction mechanism, and may be replaced with other conventional reduction mechanisms that reduce the moving amount of the output side (tray 80 side) member compared to the moving amount of the input side (driving source side) member.

The moving amount of the drive racks 15 in moving the toner cartridge 70*k* from the attached position to the retracted position may be made greater than the moving amount of the drive racks 15 in moving the toner cartridges 70*y* to 70*c* from their attached position to their retracted position.

The shorter the distance by which the toner cartridge 70 moves from the attached position to the retracted position, the shorter the moving time of the toner cartridge 70 can be made and the shorter the time for the user to wait for the movement of the toner cartridge 70. The configuration where the moving amount of the drive rack 15 relative to the toner cartridge 70*k* is greater than the moving amount of the drive rack 15 relative to the toner cartridges 70*y* to 70*c* as described above can reduce the time for the user to wait for the movement of the toner cartridges 70*y* to 70*c*.

The foregoing configuration can make the moving distance L1 greater than the moving distance L2. These configurations can be used in combination.

(Modification)

While the to-be-driven portions are described to include the pinion gears 94 to mesh with both the drive racks 15 and the rack portions 83, the to-be-driven portions may include gears to mesh with the drive racks 15 and gears to mesh with the rack portions 83.

The configuration of the moving devices for moving the trays 80 are not limited to the rack-and-pinion configuration, either. For example, the members corresponding to the pinion gears 94 may be replaced with rollers to be driven to rotate by the motor M2, and the trays 80 may be moved by friction between the rollers and the trays 80.

When the rollers to be driven to rotate by the motor M2 are used, the rollers may be brought into contact with the toner cartridges 70. In such a case, the toner cartridges 70*y* to 70*k* may be configured to be directly detachable and attachable from/to the rotary main body 90 without the intervention of the trays 80*y* to 80*k*. In such a case, the driving devices may be constituted by the rollers.

(Configuration for Detecting Remaining Toner Levels of Developing Accommodation Portions)

A configuration for detecting the remaining levels of toner in the developing frames 53 of the image forming apparatus 1 according to the first embodiment will be described with reference to FIGS. 13 to 20.

The amounts of toner in the toner cartridges 70 decrease each time an image forming operation is performed. If the toner levels in the toner cartridges 70 are low, less toner is supplied from the toner cartridges 70 to the developing frames 53. As a result, the remaining toner levels in the developing frames 53 decrease. If image formation is performed with the remaining toner levels in the developing frames 53 low, image defects can occur on the print product. The image forming apparatus 1 according to the present embodiment thus includes a configuration for detecting the remaining toner levels in the developing frames 53.

That the remaining toner levels in the toner cartridges 70 are low can be detected by detecting that the remaining toner levels in the developing frames 53 are low. When the toner in any of the toner cartridges 70 is detected to be running low, the image forming apparatus 1 can thus issue notification to replace the toner cartridge 70.

The configuration for detecting the remaining levels in the developing frames 53 will be described with reference to FIGS. 1 and 13. FIG. 13 is a plan view of the rotary. As illustrated in FIG. 13, the developing units 50*y*, 50*m*, 50*c*, and 50*k* include the developing frames 53*y*, 53*m*, 53*c*, and 53*k*, respectively. Magnetic body units 103*y*, 103*m*, 103*c*, and 103*k* are disposed inside the developing frames 53*y*, 53*m*, 53*c*, and 53*k*, respectively. In other words, the developing frames 53 can be said to include the magnetic body units 103. The developing units 50*y*, 50*m*, 50*c*, and 50*k* can also be said to include the magnetic body units 103*y*, 103*m*, 103*c*, and 103*k*, respectively.

The magnetic body units 103*y*, 103*m*, 103*c*, and 103*k* have a common configuration and functions. When distinction is not needed, one of the four magnetic body units 103 will therefore be described with the suffixes y, m, c, and k omitted.

As illustrated in FIGS. 1 and 13, a magnetic sensor 102 is disposed above the rotary main body 90. The magnetic sensor 102 is a detection unit for detecting a magnetic field produced by a magnetic body 101. The magnetic sensor 102 is located above a rotary upper end 90*eu* that is the vertically uppermost end of the rotary main body 90. In the following description, the rotation center of the rotary main body 90 will be referred to as a rotary center Rm. The magnetic sensor 102 is located above the rotary center Rm. The magnetic sensor 102 is opposed to the rotary main body 90.

As illustrated in FIG. 1, the magnetic sensor 102 is located downstream of the intermediate transfer belt 10*a* in the retraction direction of the toner cartridge 70. The magnetic sensor 102 is also located downstream of the photosensitive drum 2*a* in the retraction direction (X direction) of the toner cartridge 70.

Figure 14A:
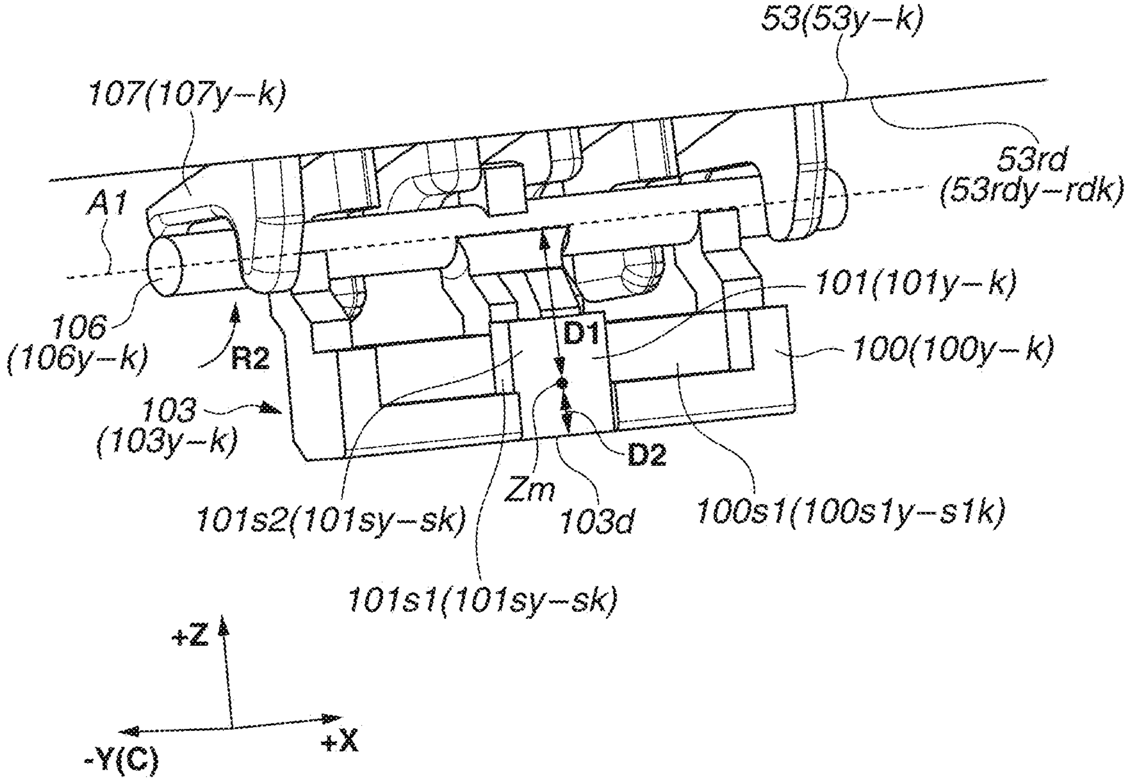
FIGS. 14A and 14B are explanatory diagrams illustrating a magnetic body unit according to the first embodiment.
Figure 14B:
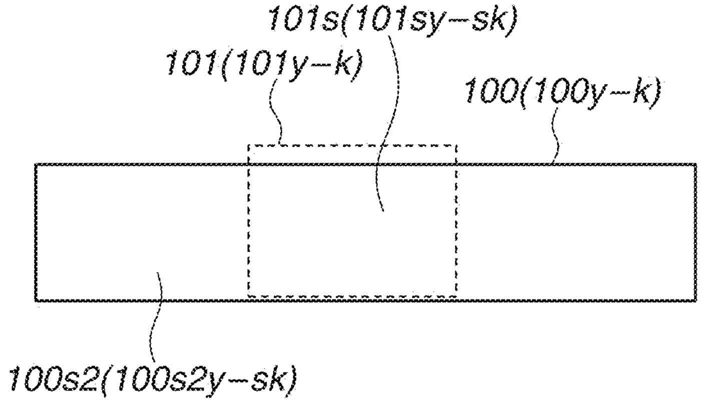

Next, the magnetic body unit 103 will be described with reference to FIGS. 13, 14A, and 14B. FIG. 14A is a perspective view of the magnetic body unit 103. FIG. 14B is a plan view of the magnetic body unit 103. In the following description, a direction from the rotary center Rm to the outside of the rotary among the radial directions of rotation of the rotary main body 90 will be referred to as a first radial direction. The downstream end of the developing frame 53 in the first radial direction will be referred to as an accommodation portion downstream end 53*rd*, and the upstream end as an accommodation portion upstream end 53*ru*. In the first radial direction, the distance between the accommodation portion upstream end 53*ru* and the rotary center Rm is smaller than the distance between the accommodation portion downstream end 53*rd* and the rotary center Rm. The accommodation portion downstream end 53*rd* and the accommodation portion upstream end 53*ru* are opposed in the first radial direction. The accommodation portion downstream end 53*rd* and the accommodation portion upstream end 53*ru* extend in a direction intersecting the first radial direction.

As illustrated in FIG. 14A, the magnetic body unit 103 is supported by the developing frame 53. More specifically, the magnetic body unit 103 is supported on the accommodation portion downstream end 53*rd*. The developing frame 53 accommodates a fixing member 107 and the magnetic body unit 103. In other words, the developing frame 53 can be said to include the fixing member 107 and the magnetic body unit 103. The magnetic body unit 103 includes the magnetic body 101, a support member 100, and a rotation shaft 106. The fixing member 107 is integrated with the developing frame 53, and fixes the rotation shaft 106 to the developing frame 53. The rotation shaft 106 is rotatably fixed to the fixing member 107. In other words, the rotation shaft 106 can be said to be a to-be-supported unit supported by the developing frame 53 via the fixing member 107.

The support member 100 is integrated with the rotation shaft 106. In other words, the support member 100 is fixed to the fixing member 107. The support member 100 can rotate with the rotation shaft 106 as the rotation axis. The rotation shaft 106 extends along the rotation axis direction of the rotary main body 90. The support member 100 is a support member that supports the magnetic body 101. In other words, the magnetic body 101 supported by the support member 100 can also rotate with the rotation shaft 106 as the rotation axis. Specifically, the rotation axis of the magnetic body 101 extends along the rotation axis direction of the rotary main body 90.

The magnetic body unit 103 can be said to be disposed inside the developing frame 53 to be movable (rotatable) relative to the developing frame 53. More specifically, the magnetic body unit 103 can rotate relative to the developing frame 53 (accommodation portion) via the rotation shaft 106 (to-be-supported unit). In other words, the magnetic body unit 103 rotates relative to the developing frame 53 about the rotation axis extending in the direction along the rotation axis of the rotary main body 90.

The magnetic body 101 is a magnet. The density of the support member 100 is lower than that of the magnetic body 101. In view of application of the present embodiment, the magnetic body 101 does not necessarily need to be a magnet, and any member may be used as long as it is a magnetic body producing a magnetic field. The shape and size of the magnet 101 are desirably modified as appropriate depending on the characteristics desired of the magnet 101.

As illustrated in FIGS. 14A and 14B, the magnetic body 101 includes a to-be-supported surface (magnetic body first surface) **101*s*1 in contact with the support member 100. The magnetic body 101 also includes a magnetic body second surface 101*s*2 located opposite to the to-be-supported surface 101*s*1. The support member 100 includes a first surface 100*s*1 in contact with the to-be-supported surface 101*s*1 and a second surface 100*s*2 that is a surface located opposite to the first surface 100*s*1. The to-be-supported surface 101*s*1, the first surface 100*s*1, and the second surface 100*s*2 each extend in the direction of the rotation axis 90C of the rotary main body 90** (Y direction).

The lengths of the first surface **100*s*1 and the second surface 100*s*2 in the direction of the rotation axis 90C of the rotary main body 90 are both greater than the length of the to-be-supported surface 101*s*1 in the direction of the rotation axis 90C of the rotary main body 90. The first surface 100*s*1 and the second surface 100*s*2 both have an area greater than that of the to-be-supported surface 101*s*1. This makes the magnetic body unit 103** less likely to be buried in the toner during the detection of the remaining toner level to be described below, and enables accurate detection of the toner remaining level.

In the following description, the rotation axis of the magnetic body unit 103 will be referred to as a rotation axis A1. A radial direction about the rotation axis A1 and from the rotation center of the magnetic body unit 103 to the magnetic body 101 will be referred to as an outward radial direction. A downstream end of the magnetic body unit 103 in the outward radial direction will be referred to as a magnetic body unit bottom end **103*d*. The center of gravity of the magnetic body unit 103** will be referred to as a center of gravity Zm.

The distance between the rotation axis A1 and the center of gravity Zm of the magnetic body unit 103 in the outward radial direction will be referred to as a distance D1. The distance between the center of gravity Zm of the magnetic body unit 103 and the magnetic body unit bottom end **103*d* in the outward radial direction will be referred to as a distance D2. The distance D1 is greater than the distance D2. This facilitates the rotation of the magnetic body unit 103 as compared to a case where the distance D1 is smaller than the distance D2. The magnetic body unit 103 thus rotates easily even in situations where the toner accumulates near the rotation shaft 106 and interferes with the rotation of the magnetic body unit 103**.

Figure 15:
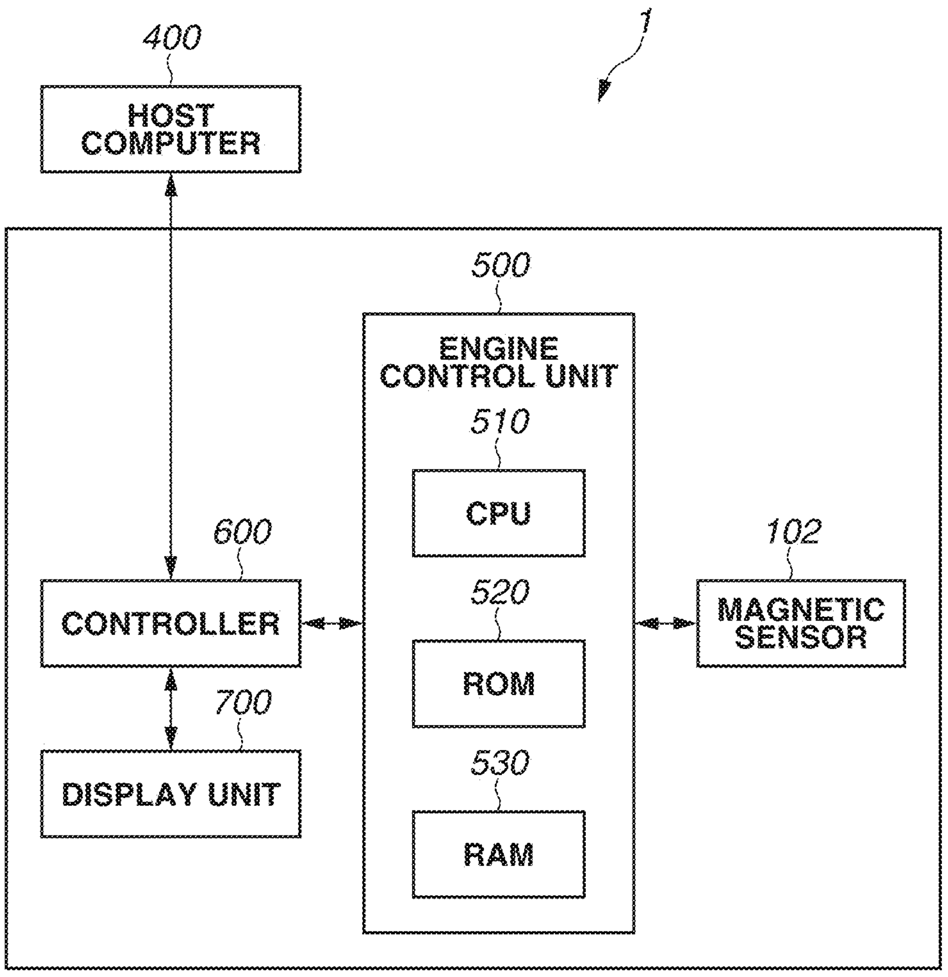
FIG. 15 is a block diagram for describing a control unit according to the first embodiment.

Next, a method for determining the amount of toner in the developing accommodation portion **53*a* will be described with reference to FIG. 15 to FIGS. 19A to 19C. A configuration of the control unit of the image forming apparatus 1 will initially be described with reference to FIG. 15. FIG. 15 is a block diagram illustrating the configuration of the control unit of the image forming apparatus 1**.

The image forming apparatus 1 includes an engine control unit 500, a controller 600, and a display unit 700. A host computer 400 transmits a print job to the image forming apparatus 1. Receiving the print job from the host computer 400, the controller 600 causes the engine control unit 500 to control the image forming operation based on the print job. The display unit 700 is a display device that can display information. An example of the display unit 700 is a display device having a display screen, such as a display. As illustrated in FIG. 6A to 6C, the display unit 700 is disposed on the frame 16.

The engine control unit 500 includes a central processing unit (CPU) 510, a read-only memory (ROM) 520, and a random access memory (RAM) 530. The ROM 520 is a nonvolatile memory that holds and stores control programs and various types of data. The ROM 520 stores determination results of the CPU 510 to be described below on the amount of toner in the developing frame 53. The RAM 530 is a volatile memory that stores temporary data.

The magnetic sensor 102 detects the magnetic field produced by the magnetic body 101, and outputs a signal based on the magnetic field produced by the magnetic body 101 to the CPU 510 of the engine control unit 500. The CPU 510 of the engine control unit 500 makes a first determination to determine the amount of toner accommodated in the developing frame 53 based on the signal output from the magnetic sensor 102. In other words, the engine control unit 500 can be referred to as a first determination unit that makes the first determination.

The engine control unit 500 controls the controller 600 to notify the display unit 700 of first information about the determination result of the first determination. The controller 600 can be referred to as a notification unit. The display unit 700 displays the first information notified by the controller 600. The first information is information about the result of the first determination. For example, the first information is information about the amount of toner. For example, the first information is information suggesting replacement of the toner cartridge 70. In other words, the engine control unit 500 can output a signal related to the amount of toner accommodated in the developing frame 53 based on the signal output from the magnetic sensor 102 (sensor output signal).

The engine control unit 500 also makes a second determination to determine the amount of toner accommodated in the toner cartridge 70 based on the determination result of the first determination. In other words, the engine control unit 500 can be referred to as a second determination unit that makes the second determination.

The engine control unit 500 controls the controller 600 to notify the display unit 700 of second information about the determination result of the second determination. The display unit 700 displays the second information notified by the controller 600. The second information is information about the result of the second determination. For example, the second information is information about the amount of toner. For example, the second information is information suggesting replacement of the toner cartridge 70. In other words, the engine control unit 500 can output a signal related to the amount of toner accommodated in the toner cartridge 70 based on the signal output from the magnetic sensor 102 (sensor output signal).

Next, a method for detecting a decrease in the amount of toner in the developing frame 53 will be described with reference to FIGS. 16 to 18. In the following description, a method for detecting the amount of toner in the developing frame 53*k* will be described as an example. However, the description also applies to the cases of detecting the amounts of toner in the developing frames 53*y*, 53*m*, and 53*c*.

Figure 16:
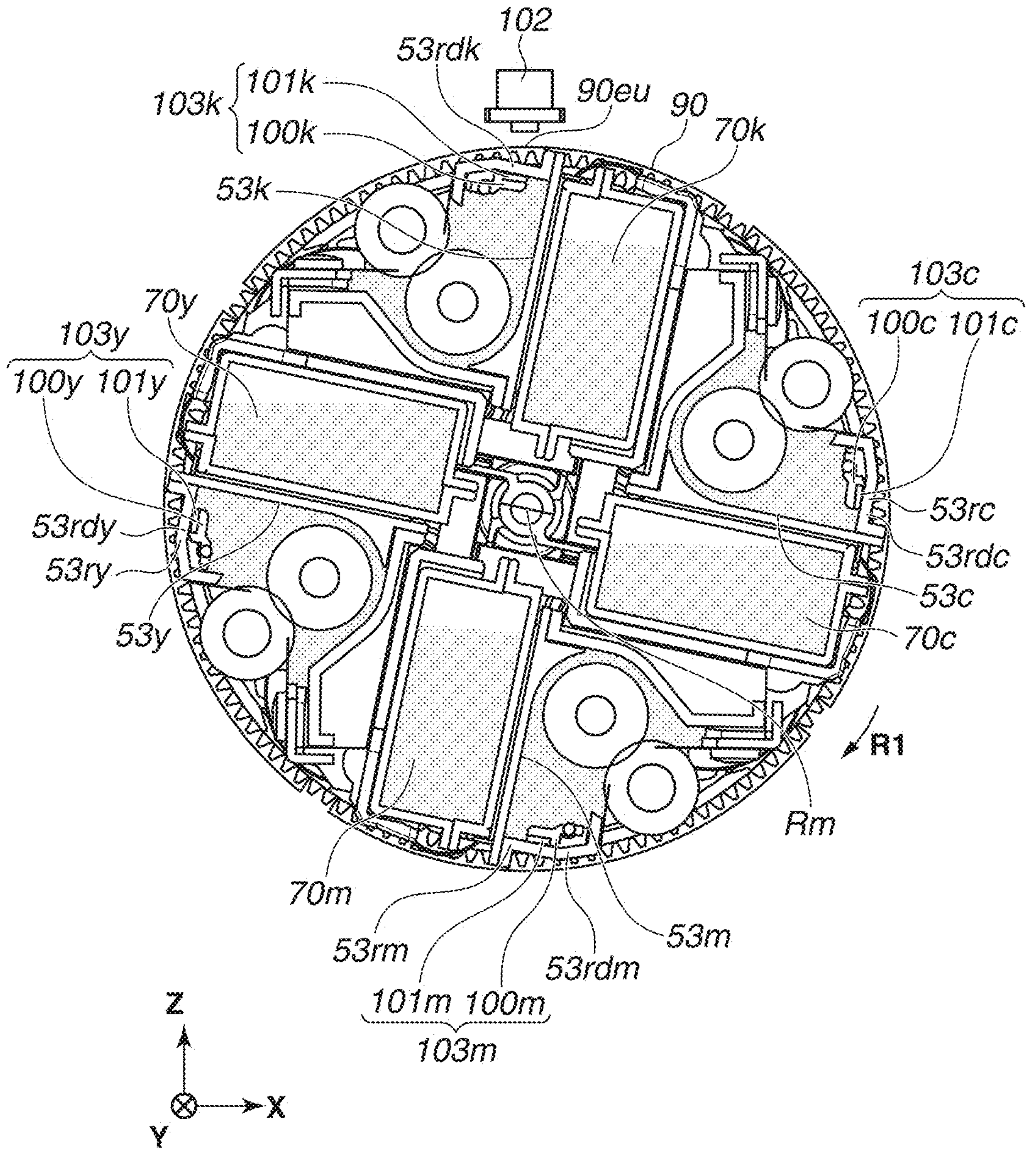
FIG. 16 is a sectional view of the rotary main body according to the first embodiment.

FIG. 16 is a sectional view of the rotary main body 90, illustrating a state where the developing frame 53 accommodates 100% toner. FIG. 17 is a sectional view of the rotary main body 90, illustrating a state where the developing frame 53 accommodates 80% toner. FIG. 18 is a sectional view of the rotary main body 90, illustrating a state where the developing frame 53 accommodates 60% toner.

As described above, the magnetic body unit 103*k* can move relative to the developing frame 53*k*.

As illustrated in FIG. 16, when there is sufficient toner in the developing frame 53*k*, the magnetic body unit 103*k* is located near the accommodation portion downstream end 53*rdk*. At least a part of the magnetic body unit 103*k* desirably contacts the accommodation portion downstream end 53*rdk*.

As image formation is performed from the state of FIG. 16, the amount of toner accommodated in the developing frame 53 decreases. When the amount of toner in the developing frame 53*k* decreases to the state illustrated in FIG. 17, the magnetic body unit 103*k* moves downward relative to the accommodation portion downstream end 53*rdk* as compared to the state of FIG. 16. When the toner in the developing frame 53 is further consumed from the state of FIG. 17 to the state of FIG. 18, the magnetic body unit 103*k* further moves downward relative to the accommodation portion downstream end 53*rd* as compared to FIG. 17.

Figure 17:
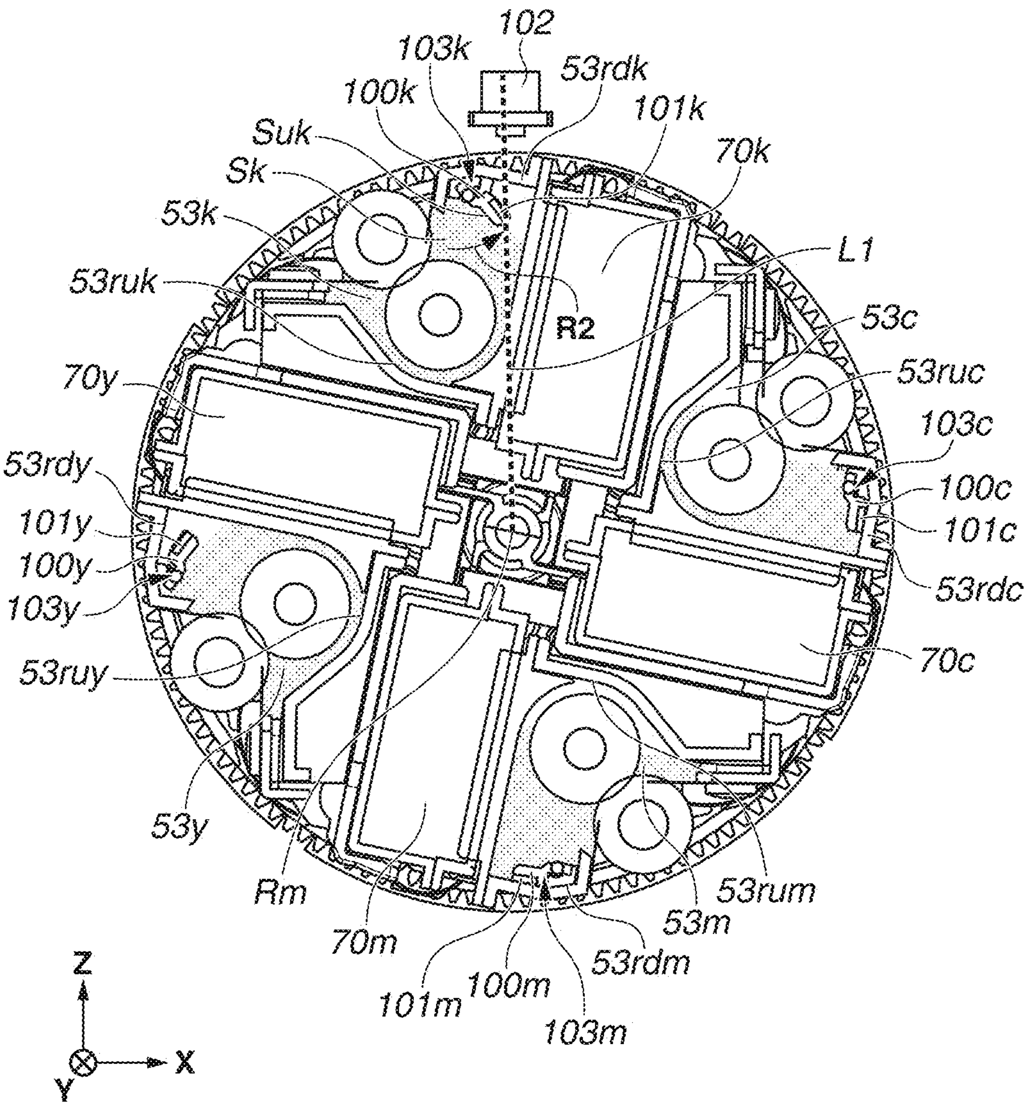
FIG. 17 is a sectional view of the rotary main body according to the first embodiment.
Figure 18:
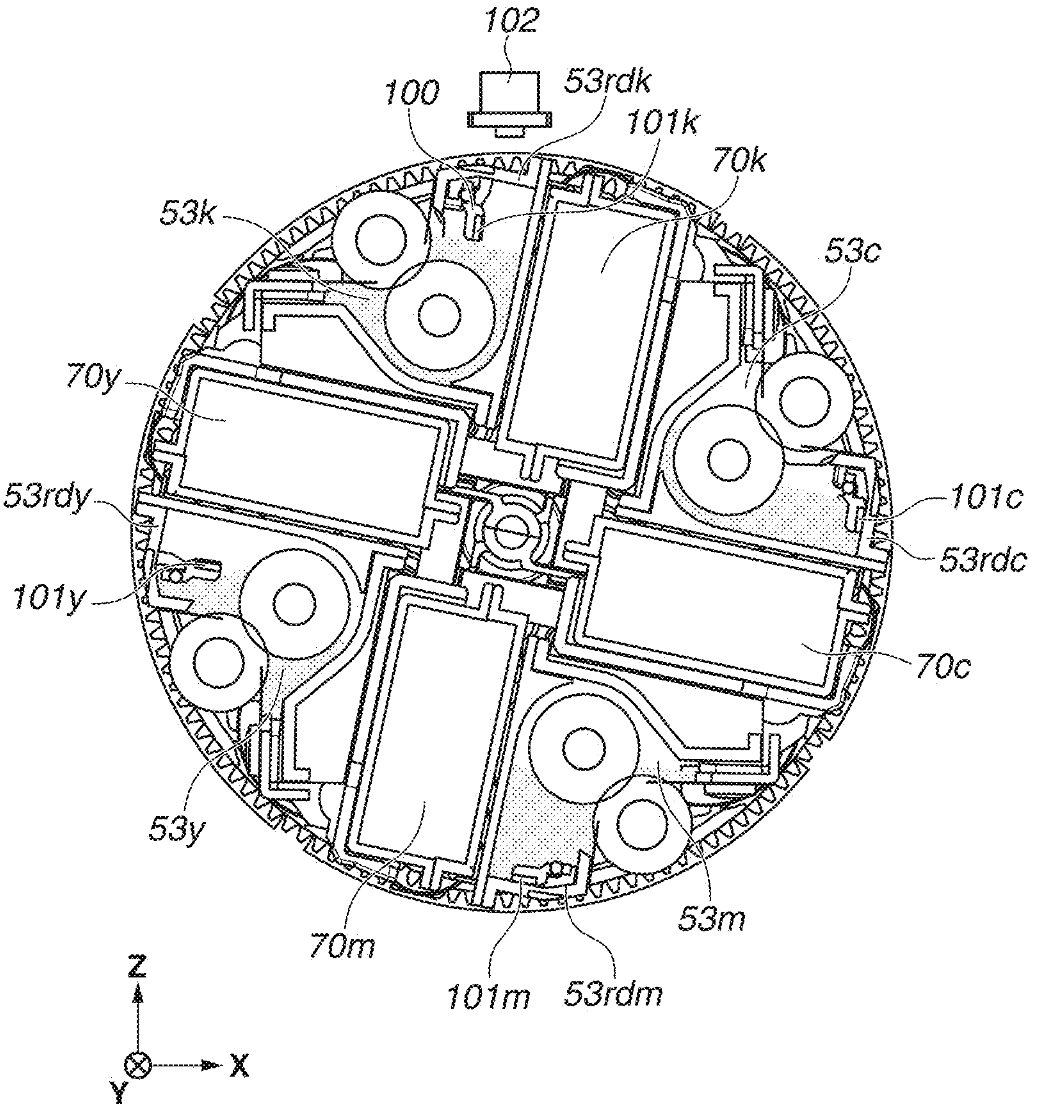
FIG. 18 is a sectional view of the rotary main body according to the first embodiment.
Figure 19A:
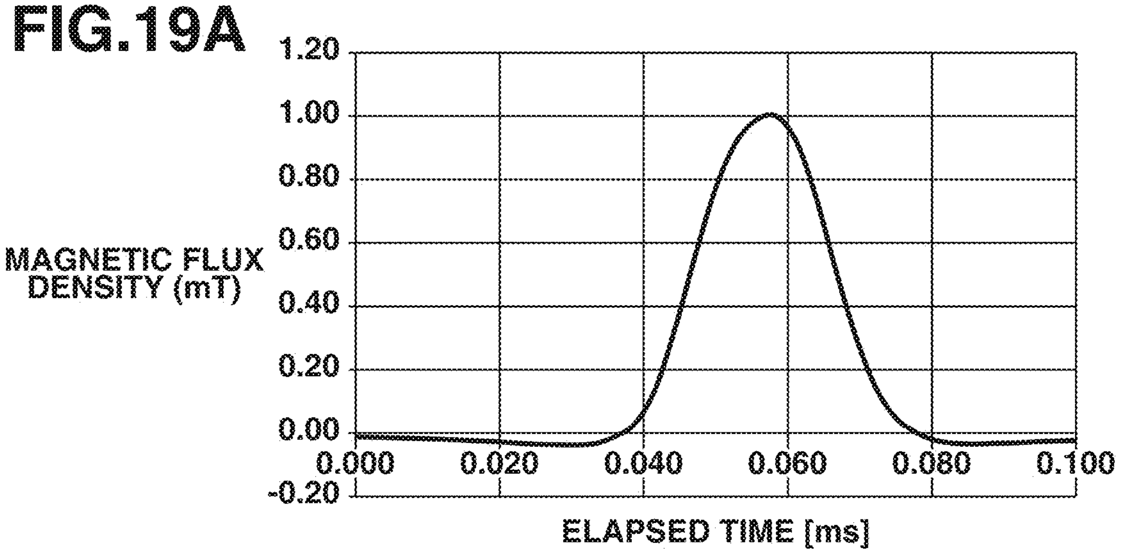
FIGS. 19A to 19C are explanatory diagrams illustrating output waveforms of a magnetic sensor according to the first embodiment.
Figure 19B:
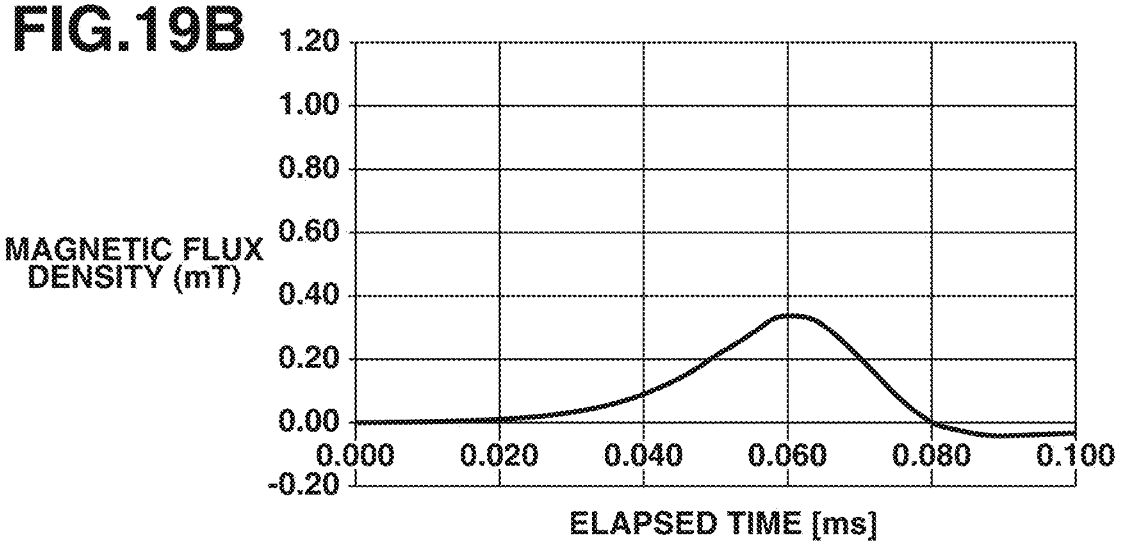
Figure 19C:
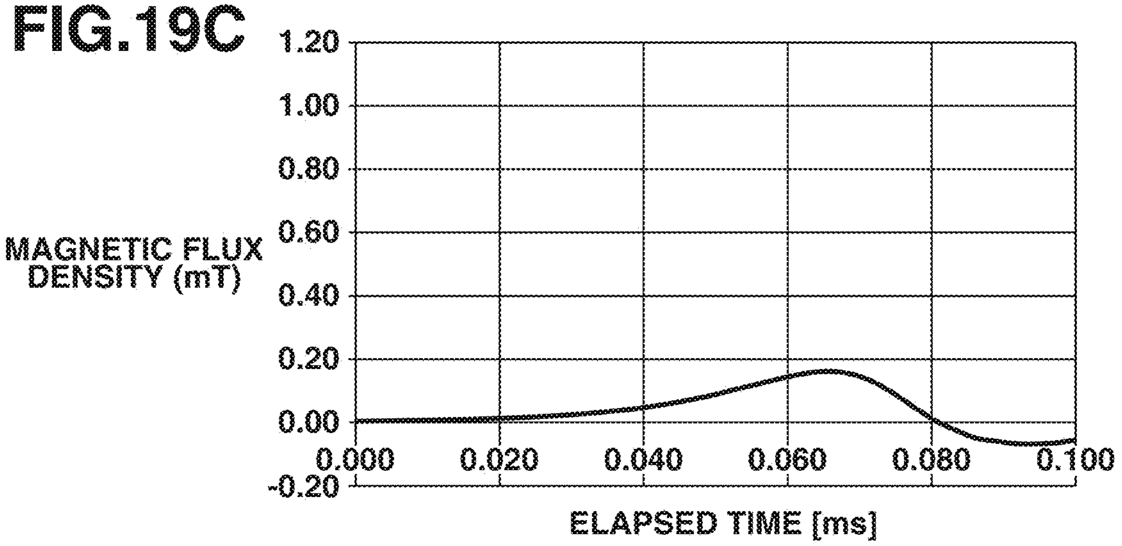

FIGS. 19A to 19C illustrate the output waveform of the signal output by the magnetic sensor 102 detecting a magnetic field produced by the magnetic body 101 in the states of FIGS. 16 to 18, respectively. FIG. 19A illustrates the output waveform at the remaining toner level of FIG. 16. FIG. 19B illustrates the output waveform at the remaining toner level of FIG. 17. FIG. 19C illustrates the output waveform at the remaining toner level of FIG. 18. The vertical axes indicate an output amount based on the magnetic flux amount detected by the magnetic sensor 102. The horizontal axes indicate the elapsed time from the start of the rotation (revolution) of the rotary main body 90.

As described above, as the amount of toner accommodated in the developing frame 53*k* decreases, the magnetic body unit 103*k* moves downward relative to the developing frame 53*k* and the distance between the magnetic body unit 103*k* and the developing frame 53*k* increases. In other words, the distance between the magnetic sensor 102 and the magnetic body unit 103*k* increases. The direction of the magnetic body 101 also changes so that the magnetic field detectable by the magnetic sensor 102 decreases. More specifically, as the amount of toner accommodated in the developing frame 53*k* decreases, the direction of the magnetic body 101 changes so that the angle formed between the direction orthogonal to the magnetic body second surface 101*s*2 and the direction from the magnetic sensor 102 to the rotary center Rm increases. As the amount of toner accommodated in the developing frame 53*k* decreases, the magnetic field of the magnetic body 101 detected by the magnetic sensor 102 therefore decreases. Consequently, as the amount of toner accommodated in the developing frame 53*k* decreases, the output value of the output waveform decreases. The engine control unit 500 determines that the amount of toner is decreasing based on a decrease in the output value of the output waveform.

In the present embodiment, the aspect ratio of the magnet, the distance between the magnetic sensor 102 and the magnetic body 101, and the sensitivity of the magnetic sensor 102 are designed so that the output value of the magnetic sensor 102 falls within the range of 100% to 0% when the amount of toner in the developing frame 53 is in the range of 100% to 60%.

The configuration may be designed so that the output value decreases sharply when the amount of toner in the developing frame 53 drops from near a toner level where the replacement of the toner cartridge 70 is determined to be desirable. Suppose, for example, that the toner level where the replacement of the toner cartridge is determined to be desirable is set to 80%. In such a case, the amount of decrease in the output value may be increased when the remaining toner level drops from 85% to 75%. For example, the amount of decrease in the output value when the remaining toner level drops from 85% to 75% is greater than the amount of decrease in the output value when the remaining toner level drops from 100% to 90%.

The configuration for causing a sharp decrease in the sensor output can improve the detection accuracy near the threshold since the output changes sharply near the threshold.

Next, an operation of the magnetic body unit 103 associated with the rotation of the rotary main body 90 will be described with reference to FIGS. 20A to 20D. While the following description deals with a method for detecting the amount of toner in the developing frame 53*k* as an example, the description applies to each of the developing frames 53*y*, 53*m*, and 53*c* as well. FIGS. 20A to 20D illustrate respective orientations that the rotary main body 90 assumes during the period of making one rotation (hereinafter, referred to as a rotation period). Like FIG. 17, FIGS. 20A to 20D illustrate a state where the amounts of toner in the developing frames 53 are 80%. The rotary main body 90 makes one rotation in an R1 direction in order of FIGS. 20A, 20B, 20C, 20D, and 20A.

In the following description, in detecting the amount of toner in the developing frame 53*k*, the orientation of the rotary main body 90 in FIG. 20A will be referred to as a first orientation. The orientation of the rotary main body 90 in FIG. 20B will be referred to as a second orientation. The orientation of the rotary main body 90 in FIG. 20C will be referred to as a third orientation. The orientation of the rotary main body 90 in FIG. 20D will be referred to as a fourth orientation.

Figure 20A:
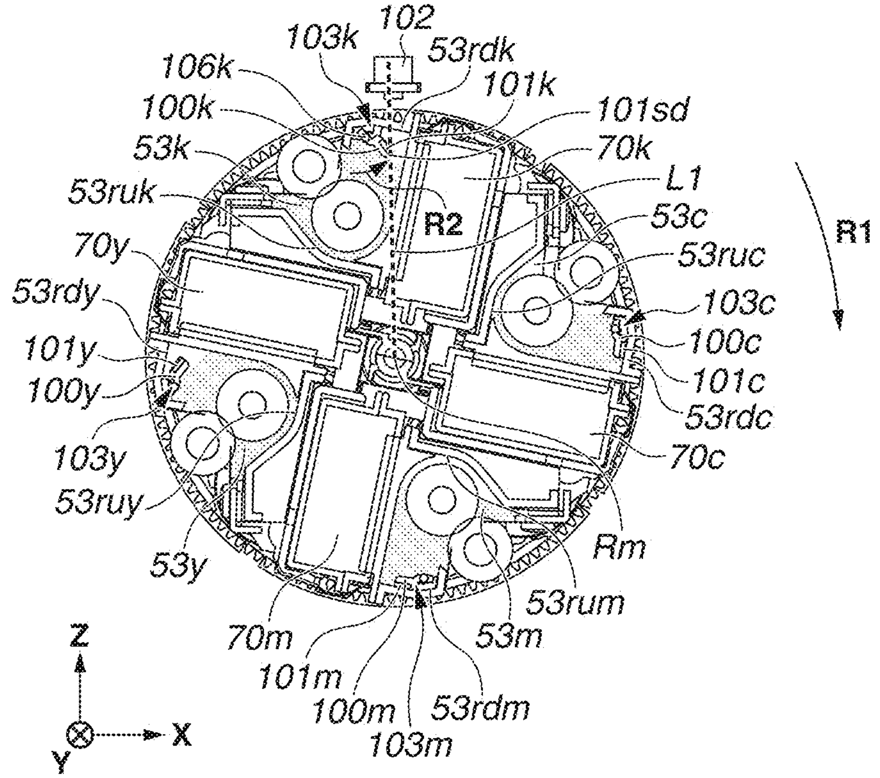
FIGS. 20A to 20D are plan views of the rotary main body according to the first embodiment.
Figure 20B:
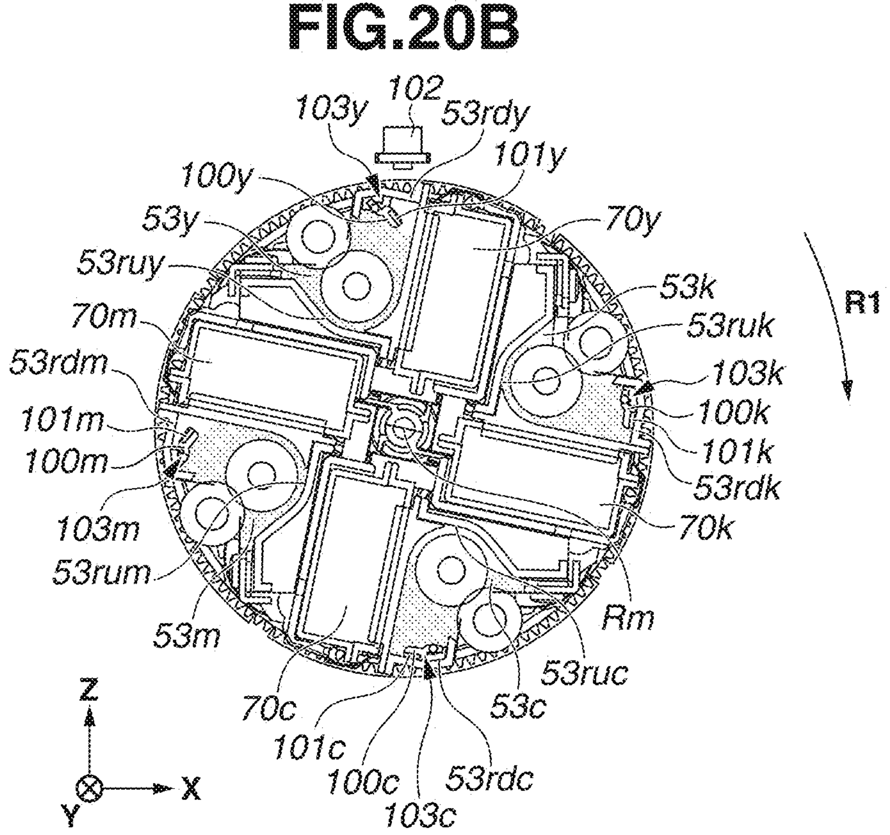

In detecting the amount of toner in the developing frame 53*y*, the orientation of the rotary main body 90 in FIG. 20B will be referred to as a first orientation. The orientation of the rotary main body 90 in FIG. 20C will be referred to as a second orientation. The orientation of the rotary main body 90 in FIG. 20D will be referred to as a third orientation. The orientation of the rotary main body 90 in FIG. 20A will be referred to as a fourth orientation.

Figure 20C:
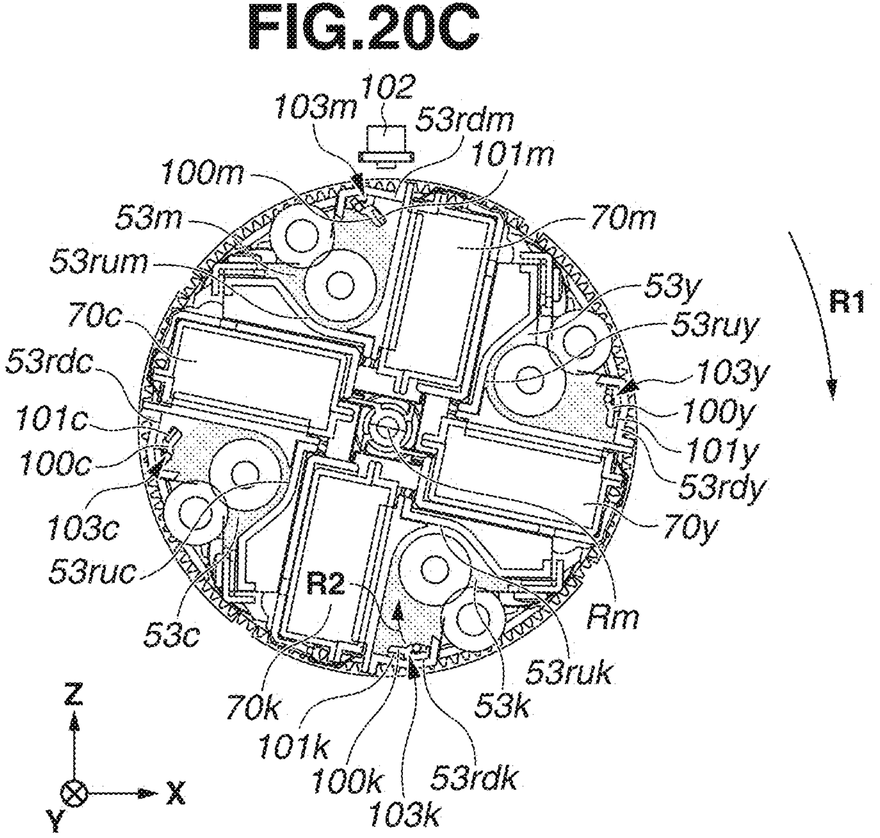

In detecting the amount of toner in the developing frame 53*m*, the orientation of the rotary main body 90 in FIG. 20C will be referred to as a first orientation. The orientation of the rotary main body 90 in FIG. 20D will be referred to as a second orientation. The orientation of the rotary main body 90 in FIG. 20A will be referred to as a third orientation. The orientation of the rotary main body 90 in FIG. 20B will be referred to as a fourth orientation.

Figure 20D:
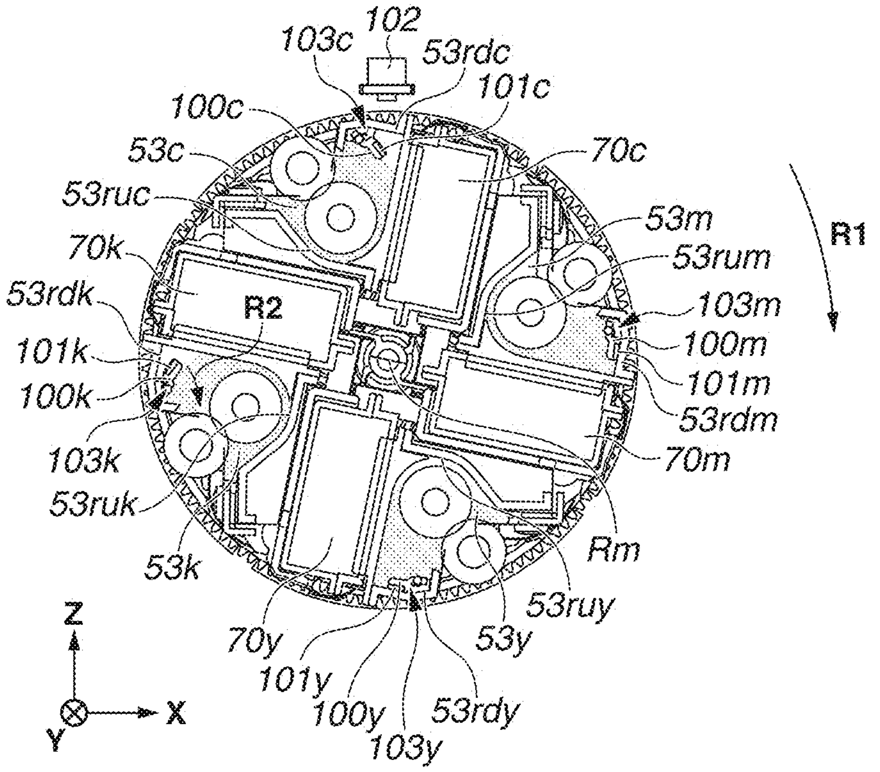

In detecting the amount of toner in the developing frame 53*c*, the orientation of the rotary main body 90 in FIG. 20D will be referred to as a first orientation. The orientation of the rotary main body 90 in FIG. 20A will be referred to as a second orientation. The orientation of the rotary main body 90 in FIG. 20B will be referred to as a third orientation. The orientation of the rotary main body 90 in FIG. 20C will be referred to as a fourth orientation.

The movement of the magnetic body unit 103*k* when the rotary main body 90 transitions from the first orientation to the second orientation will initially be described. When the rotary main body 90 assumes the first orientation, the magnetic body unit 103*k* is located above the rotary center Rm. In the following description, the straight line passing through the rotary center Rm and the magnetic sensor 102 as viewed in the rotation axis direction of the rotary main body 90 will be referred to as a straight line L1.

When the rotary main body 90 is in the first orientation, the magnetic body unit 103*k* intersects the straight line L1 as viewed in the rotation axis direction of the rotary main body 90. In other words, as viewed in the rotation axis direction of the rotary, the rotation center of the rotary main body 90, the magnetic body unit 103*k* (magnetic body 101*k*), and the magnetic sensor 102 are aligned on a straight line in the radial direction of rotation of the rotary main body 90 (first radial direction). In the following description, the timing when the rotation center of the rotary main body 90, the magnetic body unit 103*k* (magnetic body 101*k*), and the magnetic sensor 102 are aligned on the straight line in the first radial direction will be referred to as parallel timing.

At the parallel timing of the developing frame 53*k*, the magnetic body unit 103*k* (magnetic body 101*k*) is closer to the magnetic sensor 102 than the rotation center of the rotary main body 90 is in the radial direction of rotation of the rotary main body 90. The magnetic body unit 103*k* (magnetic body 101*k*) is located between the rotation center of the rotary main body 90 and the magnetic sensor 102 in the radial direction of rotation of the rotary main body 90.

When the rotary main body 90 rotates in the R1 direction and transitions from the first orientation to the second orientation, the magnetic body unit 103*k* also revolves in the R1 direction and moves downward with the rotary center Rm as the rotation center. The magnetic body unit 103*k* also moves downstream in the retraction direction of the toner cartridge 70. While revolving in the R1 direction, the magnetic body unit 103*k* also rotates in an R2 direction with the rotation shaft 106 as the rotation axis. The R2 direction is opposite to the R1 direction. The transitioning period from the first orientation to the second orientation will be referred as a second period. In the second period, the magnetic body unit 103 can be said to be allowed to move in a direction to approach the accommodation portion downstream end 53*rdk* from the accommodation portion upstream end 53*ruk*. The rotation period can be said to include the second period.

When the rotary main body 90 rotates in the R1 direction and transitions from the first orientation to the second orientation, the toner also moves in the direction from the accommodation portion upstream end 53*ruk* to the accommodation portion downstream end 53*rdk*. As the magnetic body unit 103*k* rotates in the R2 direction, the magnetic body unit 103*k* approaches the accommodation portion downstream end 54*rdk* and eventually comes into contact with the accommodation portion downstream end 53*rdk*. With the magnetic body unit 103*k* in contact with the accommodation portion downstream end 53*rdk*, the toner is less likely to enter the space between the magnetic body unit 103*k* and the accommodation portion downstream end 53*rdk*. This enables accurate detection of the amount of toner in the developing frame 53 in a first period to be described below.

When the rotary main body 90 assumes the second orientation, the magnetic body unit 103*k* is located downstream of the rotary center Rm in the retraction direction of the toner cartridge 70. Moreover, when the rotary main body 90 assumes the second orientation, the rotary center Rm and at least a part of the magnetic body unit 103*k* overlap in vertical position.

Next, a mechanism when the rotary main body 90 transitions from the second orientation to the third orientation will be described. When the rotary main body 90 rotates in the R1 direction and transitions from the second orientation to the third orientation, the magnetic body unit 103*k* also revolves to move downward. The magnetic body unit 103*k* also moves upstream in the retraction direction of the toner cartridge 70. When the magnetic body unit 103*k* revolves in the R1 direction, the magnetic body unit 103*k* undergoes gravitational force that urges the magnetic body unit 103*k* to move toward the accommodation portion downstream end 53*rdk*. Since the magnetic body unit 103*k* is in contact with the accommodation portion downstream end 53*rd*, the rotation with the rotation shaft 106 as the rotation axis is restricted. When the rotary main body 90 assumes the third orientation, the magnetic body unit 103*k* is located below the rotary center Rm. When the rotary main body 90 assumes the third orientation, at least a part of the magnetic body 101 and the rotary center Rm are located at the same position in the retraction direction of the toner cartridge 70.

Next, a mechanism when the rotary main body 90 transitions from the third orientation to the fourth orientation will be described. When the rotary main body 90 rotates in the R1 direction and transitions from the third orientation to the fourth orientation, the magnetic body unit 103*k* revolves in the R1 direction to move upward. The magnetic body unit 103*k* also moves upstream in the retraction direction of the toner cartridge 70. Here, the magnetic body unit 103*k* undergoes the gravitational force and rotates in the R1 direction with the rotation shaft 106 as the rotation axis. More specifically, the magnetic body unit 103*k* rotates in the direction from the accommodation portion downstream end 53*rdk* to the accommodation portion upstream end 53*ruk*. The period when the rotary main body 90 transitions from the third orientation to the fourth orientation can be said to be a first period during which the direction of movement allowed for the magnetic body unit 103 relative to the developing frame 53 includes a gravitational direction component. In the first period, the moving direction in which the magnetic body unit 103 can move relative to the developing frame 53 can also be said to include a vertically downward component. The rotation period where the rotary main body 90 makes one rotation can be said to include the first period.

More specifically, the direction in which the magnetic body unit 103 is allowed to move is a direction to approach the accommodation portion upstream end 53*ruk* from the accommodation portion downstream end 53*rdk*. In other words, in the first period, the moving direction in which the magnetic body unit 103 can move relative to the developing frame 53 is the direction to approach the accommodation portion upstream end 53*ruk* from the accommodation portion downstream end 53*rdk*. In the first period, the rotation direction of the magnetic body unit 103 is the same as that of the rotary main body 90.

The first period includes an interference period during which the magnetic body unit 103*k* is in contact with the toner, whereby the movement of the magnetic body unit 103*k* in a direction including the gravitational direction component is prevented (interfered).

In other words, the first period can be said to include a contact period during which the magnetic body unit 103 contacts the toner (developer) and is received by the developer. More specifically, in the contact period, the second surface 100*s*2 contacts the developer and is received by the developer.

When the rotary main body 90 assumes the fourth orientation, the magnetic body 101*k* is located upstream of the rotary center Rm in the retraction direction of the toner cartridge 70. Moreover, when the rotary main body 90 assumes the fourth orientation, the rotary center Rm and at least a part of the magnetic body 101*k* overlap in vertical position.

Next, a mechanism when the rotary main body 90 transitions from the fourth orientation to the first orientation will be described. When the rotary main body 90 rotates in the R1 direction and transitions from the fourth orientation to the first orientation, the magnetic body unit 103 revolves in the R1 direction to move upward. The magnetic body unit 103*k* also moves downstream in the retraction direction of the toner cartridge 70. Here, the magnetic body unit 103*k* rotates in the R1 direction. More specifically, the magnetic body unit 103*k* rotates in the direction from the accommodation portion downstream end 53*rdk* to the accommodation portion upstream end 53*ruk*. That is, the period during which the rotary main body 90 transitions from the fourth orientation to the first orientation can be said to be the first period during which the direction of movement allowed for the magnetic body unit 103 relative to the developing frame 53 includes a gravitational direction component.

In other words, in the first period, the direction in which the magnetic body unit 103 can move relative to the developing frame 53 can be said to include a vertically downward component. The rotation period during which the rotary main body 90 makes one rotation can be said to include the first period.

More specifically, the direction in which the magnetic body unit 103 is allowed to move is the direction to approach the accommodation portion upstream end 53*ruk* from the accommodation portion downstream end 53*rdk*. That is, in the first period, the moving direction in which magnetic body unit 103 can move relative to the developing frame 53 is the direction to approach the accommodation portion upstream end 53*ruk* from the accommodation portion downstream end 53*rdk*.

The first period includes the interference period during which the magnetic body unit 103*k* is in contact with the toner, whereby the movement of the magnetic body unit 103*k* in a direction including the gravitational direction component is prevented (interfered). In other words, the first period can be said to include the contact period during which the magnetic body unit 103 contacts the toner (developer) and is received by the developer. In the contact period, the second surface 100*s*2 contacts the developer and is received by the developer. The first period includes the parallel timing.

More specifically, the contact period includes the parallel timing.

As illustrated in FIG. 20A, the direction from the rotation center Rm to the magnetic sensor 102 among the radial directions of rotation of the rotary main body 90 will be referred to as a sensor radius direction. The amount of the developer accommodated in the developing frame 53 in the state of FIG. 16 will be referred to as a first amount. The amount of the developer accommodated in the developing frame 53 in the state of FIG. 17 will be referred to as a second amount.

When the amount of the developer accommodated in the developing frame 53 is the first amount, the distance between the magnetic sensor 102 and the magnetic body 101*k* in the sensor radius direction at the parallel timing can be said to be a first distance. When the amount of the developer accommodated in the developing frame 53 is the second amount smaller than the first amount, the distance between the magnetic sensor 102 and the magnetic body 101*k* in the sensor radius direction at the parallel timing can be said to be a second distance. The second distance is greater than the first distance.

At the parallel timing, the distance between the rotation shaft 106 (to-be-supported unit) and the accommodation portion downstream end 53*rd* in the sensor radius direction is smaller than the distance between the rotation shaft 106 (to-be-supported unit) and the accommodation portion upstream end 53*ru* in the sensor radius direction. This makes the magnetic body unit 103 less likely to be buried in the toner at the parallel timing.

The magnetic sensor 102 according to the present embodiment detects the magnetic field of the magnetic body 101 while the rotary main body 90 makes one rotation, and outputs a signal. More specifically, the magnetic sensor 102 outputs a signal based on the magnetic field produced by the magnetic body 101 in at least a part of the first period. In the present embodiment, the magnetic sensor 102 continues detection during the rotation period when the rotary main body 90 makes one rotation. However, the magnetic sensor 102 may perform detection only during a period shorter than that of one rotation of the rotary main body 90. In such a case, the magnetic sensor 102 desirably detects the magnetic field in at least a part of the period in which the rotary main body 90 transitions from the third orientation to the first orientation.

As has been described above, the rotation of the rotary main body 90 can move the magnetic body 101 relative to the developer. This enables a reduction of moving members for moving the magnetic body relative to the developer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-075079, filed May 7, 2024, which is hereby incorporated by reference herein in its entirety.

What is claimed is:

1. An image forming apparatus comprising:

a developing unit including (I) an accommodation portion configured to accommodate a developer, (II) a developing member configured to develop an electrostatic latent image formed on a photosensitive drum with the developer accommodated in the accommodation portion, and (III) a magnetic body unit including a magnetic body, the magnetic body unit being located inside the accommodation portion and supported to be movable relative to the accommodation portion in a moving direction;

a rotary configured to rotate, the rotary including the developing unit; and a magnetic sensor, wherein a rotation period for the rotary to make one rotation includes a first period, wherein in the first period, the moving direction includes a vertically downward component, wherein the first period includes a contact period during which the magnetic body unit contacts the developer and is received by the developer, wherein the contact period includes parallel timing at which a rotation center of the rotary, the magnetic body unit, and the magnetic sensor are aligned on a straight line in a radial direction of rotation of the rotary as viewed in a rotation axis direction of the rotary, and wherein the magnetic sensor is configured to output a signal based on a magnetic field produced by the magnetic body in at least a part of the first period.

2. The image forming apparatus according to claim 1, wherein a direction from the rotation center of the rotary to the magnetic sensor among radial directions of rotation of the rotary is a sensor radius direction, wherein a first distance is a distance between the magnetic sensor and the magnetic body in the sensor radius direction at the parallel timing in a case where an amount of the developer accommodated in the accommodation portion is a first amount, wherein a second distance is the distance between the magnetic sensor and the magnetic body in the sensor radius direction at the parallel timing in a case where the amount of the developer accommodated in the accommodation portion is a second amount smaller than the first amount, and wherein the second distance is greater than the first distance.

3. The image forming apparatus according to claim 2, wherein the magnetic body unit includes a to-be-supported unit supported by the accommodation portion, wherein a downstream end of the accommodation portion in the sensor radius direction is an accommodation portion downstream end, wherein an upstream end of the accommodation portion in the sensor radius direction is an accommodation portion upstream end, and wherein at the parallel timing, a distance between the to-be-supported unit and the accommodation portion downstream end in the sensor radius direction is smaller than a distance between the to-be-supported unit and the accommodation portion upstream end in the sensor radius direction.

4. The image forming apparatus according to claim 3, wherein the magnetic body unit is configured to rotate relative to the accommodation portion via the to-be-supported unit.

5. The image forming apparatus according to claim 4, wherein the magnetic body unit is configured to rotate relative to the accommodation portion about a rotation axis extending in a direction along a rotation axis of the rotary.

6. The image forming apparatus according to claim 5, wherein in the first period, a rotation direction of the magnetic body unit is same as that of the rotary.

7. The image forming apparatus according to claim 3, wherein at the parallel timing, the moving direction is a direction to approach the accommodation portion upstream end from the accommodation portion downstream end.

8. The image forming apparatus according to claim 3, wherein the rotation period includes a second period during which the magnetic body unit is configured to move in a direction to approach the accommodation portion downstream end from the accommodation portion upstream end.

9. The image forming apparatus according to claim 1, wherein the magnetic sensor is located above the rotation center of the rotary when the image forming apparatus is installed on a horizontal plane.

10. The image forming apparatus according to claim 9, wherein a rotary end is an uppermost end of the rotary, and wherein the magnetic sensor is located above the rotary end.

11. The image forming apparatus according to claim 1, wherein the magnetic body unit includes a support member having a density lower than that of the magnetic body, the support member being a support unit configured to support the magnetic body.

12. The image forming apparatus according to claim 11, wherein the magnetic body includes a to-be-supported surface, wherein the support member includes a first surface in contact with the to-be-supported surface and a second surface located opposite to the first surface, and wherein the second surface is configured to contact the developer and be received by the developer in the contact period.

13. The image forming apparatus according to claim 12, wherein the second surface has an area greater than that of the to-be-supported surface.

14. The image forming apparatus according to claim 1, further comprising:

a first determination unit configured to make a first determination to determine an amount of the developer accommodated in the accommodation portion based on the signal output from the magnetic sensor, and a control unit configured to control a notification unit, the notification unit being configured to notify first information about a determination result of the first determination unit.

15. The image forming apparatus according to claim 14, wherein the image forming apparatus is configured so that a cartridge configured to accommodate the developer is detachably attached thereto, and wherein the developer is supplied from the cartridge to the accommodation portion.

16. The image forming apparatus according to claim 15, further comprising a second determination unit configured to make a second determination to determine an amount of the developer accommodated in the cartridge based on the determination result of the first determination, wherein the control unit is configured to control the notification unit so that the notification unit is configured to notify second information about a determination result of the second determination unit.

17. The image forming apparatus according to claim 16, further comprising a display unit configured to display the first information or the second information notified by the notification unit.

18. The image forming apparatus according to claim 1, wherein the magnetic body is a magnet.

19. The image forming apparatus according to claim 1, further comprising a tray configured to hold a cartridge in a detachably attachable manner, the cartridge being configured to accommodate the developer, wherein the tray is configured to move to an accommodation position where the cartridge is located inside the rotary and a detachment position where the cartridge is located outside the rotary.

* * * * *